United States Patent [19]

Suzuki et al.

[11] Patent Number: 5,014,834
[45] Date of Patent: May 14, 1991

[54] SPEED RESPONSIVE ONE-WAY CENTRIFUGAL CLUTCH

[75] Inventors: Akimitsu Suzuki; Kozaburo Igari; Hiroshi Yabe, all of Fujisawa, Japan

[73] Assignee: NSK-Warner Kabushiki Kaisha, Tokyo, Japan

[21] Appl. No.: 508,332

[22] Filed: Apr. 11, 1990

[30] Foreign Application Priority Data

Apr. 12, 1989 [JP] Japan .................................. 1-90559

[51] Int. Cl.$^5$ .............................................. F16D 47/06
[52] U.S. Cl. ................................. 192/48.3; 192/3.31; 192/105 BA
[58] Field of Search ....................... 192/48.3, 3.31, 45, 192/48.92, 105 BA, 106.2

[56] References Cited

U.S. PATENT DOCUMENTS

| 3,958,680 | 5/1976 | Armbruster et al. | 192/105 BA |
|---|---|---|---|
| 4,113,075 | 9/1978 | Walker | 192/3.31 |
| 4,140,208 | 2/1979 | Clauss et al. | 192/3.31 |
| 4,690,257 | 9/1987 | Suzuki et al. | 192/3.31 |

FOREIGN PATENT DOCUMENTS 940956 12/1948 France .............................. 192/3.31
1121178 7/1956 France ........................... 192/105 BA Primary Examiner—Allan D. Herrmann
Assistant Examiner—Andrea Pitts
Attorney, Agent, or Firm—Skjerven, Morrill, MacPherson, Franklin & Friel

[57] ABSTRACT

A speed responsive centrifugal clutch having a one-way clutch function and suitable for use as a lock-up clutch of a torque converter is provided. The one-way clutch is provided not as a separate component but as structurally integrated in the clutch. The speed responsive centrifugal clutch includes a clutch plate fixedly mounted on a rotating shaft, a damper plate supported to be rotatable relative to the clutch plate and carrying damper elements, a reaction ring supported to be rotatable over a predetermined angle range relative to the damper plate, a plurality of shoe assemblies supported by the reaction ring to be displasable radially outwardly due to centrifugal forces, and a one-way clutch mechanism incorporated between the clutch plate and the damper plate. Because of the provision of such a one-way clutch mechanism in this particular manner, the overall size of the clutch can be minimized and transmission of rotating force can be carried out extremely smoothly.

9 Claims, 19 Drawing Sheets

11 : INPUT SHAFT
12 : COVER
17 : TURBINE HUB
18 : RIVET
20 : CLUTCH ASSEMBLY

11 : INPUT SHAFT
12 : COVER
17 : TURBINE HUB
18 : RIVET
20: CLUTCH ASSEMBLY

20 : CLUTCH ASSEMBLY
30 : SIDE PLATE
32 : DAMPER PLATE
34 : REACTION RING
36 : CLUTCH PLATE
38 : RETAINER PLATE
40 : ROLLER
42 : SHOE ASSEMBLY
44 : DAMPER SPRING

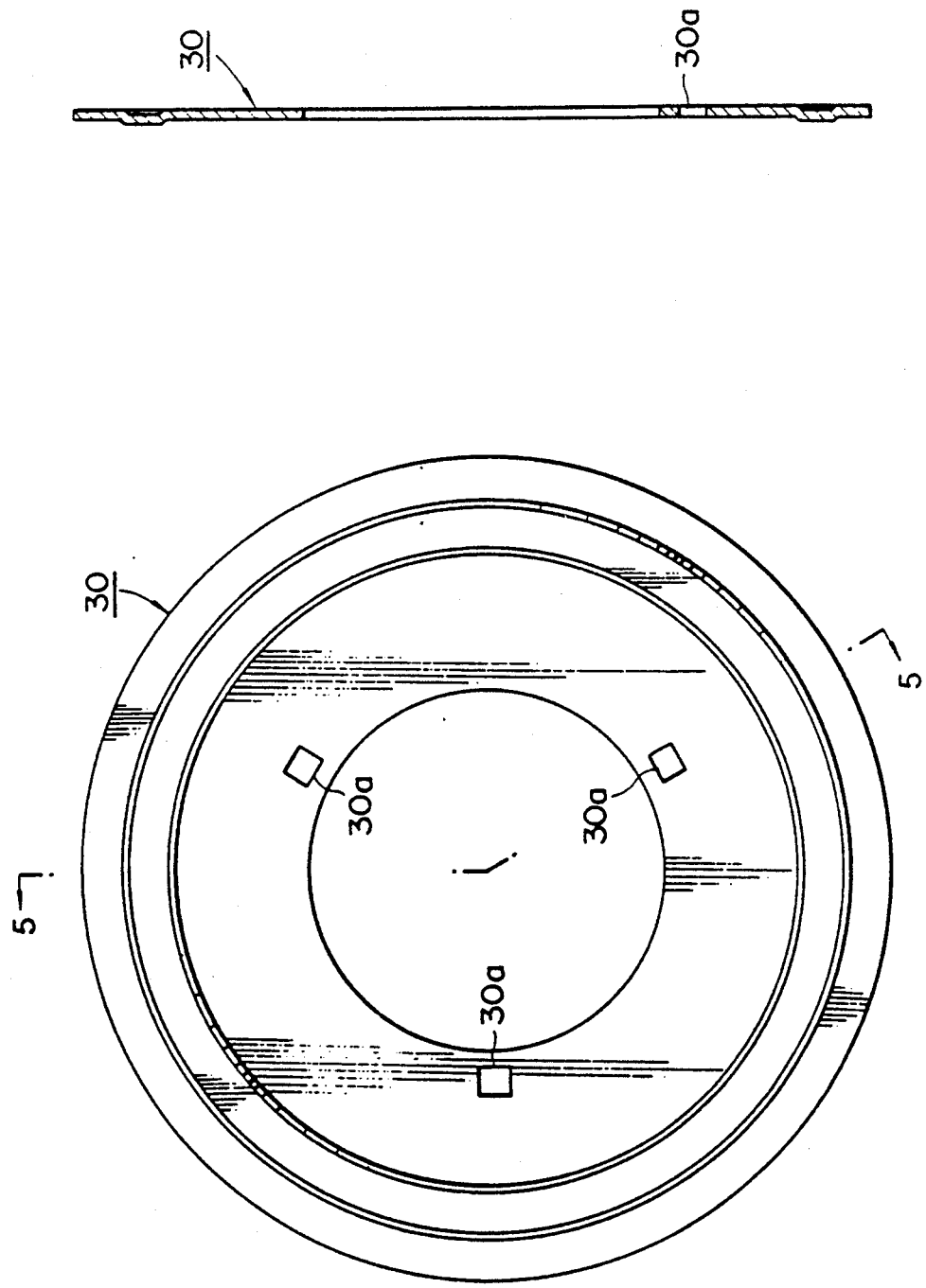

- 120 : CLUTCH ASSEMBLY
- 130 : SIDE PLATE
- 132 : DAMPER PLATE
- 134 : REACTION RING
- 136 : CLUTCH PLATE
- 138 : RETAINER PLATE
- 40 : ROLLER
- 42 : SHOE ASSEMBLY
- 44 : TORSION SPRING
- 50 : OUTER RING
- 52 : INNER RING

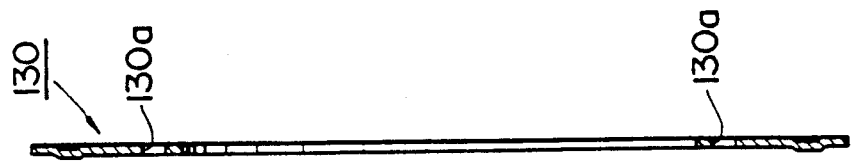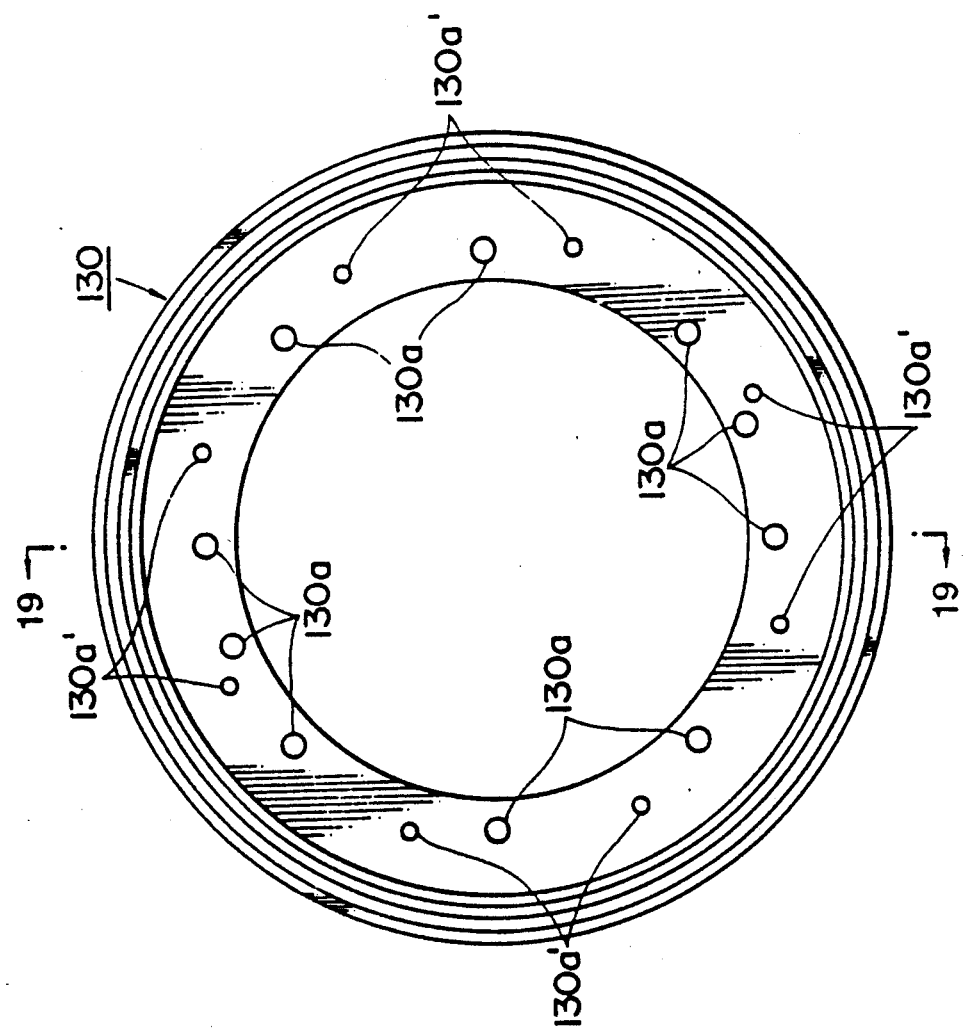

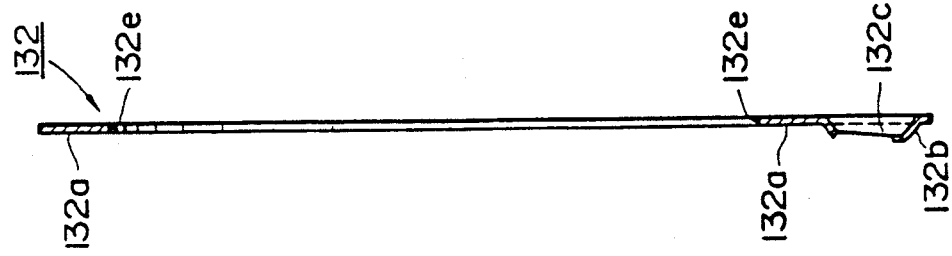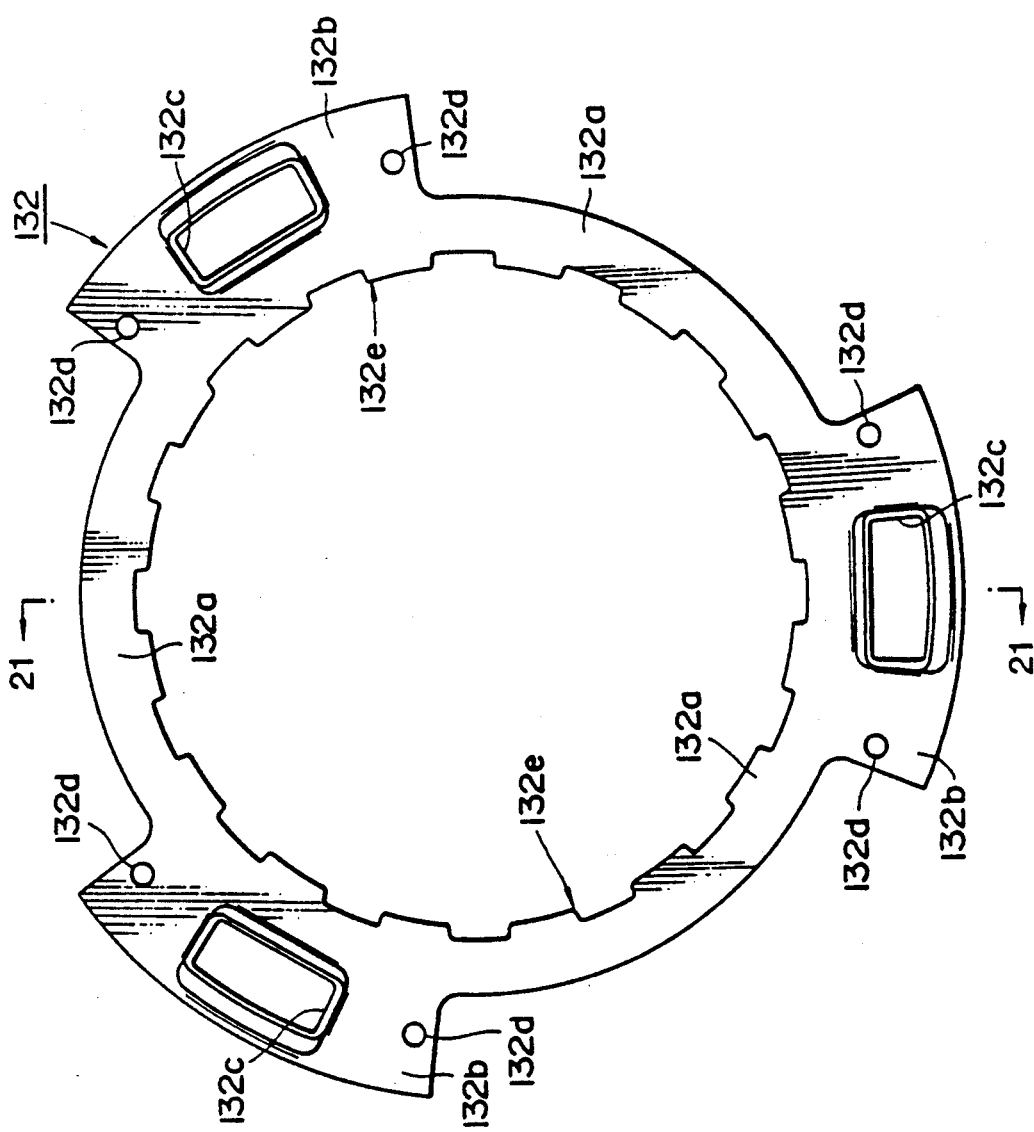

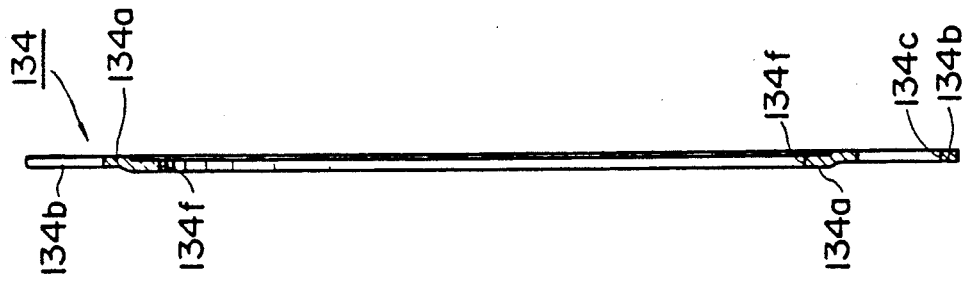
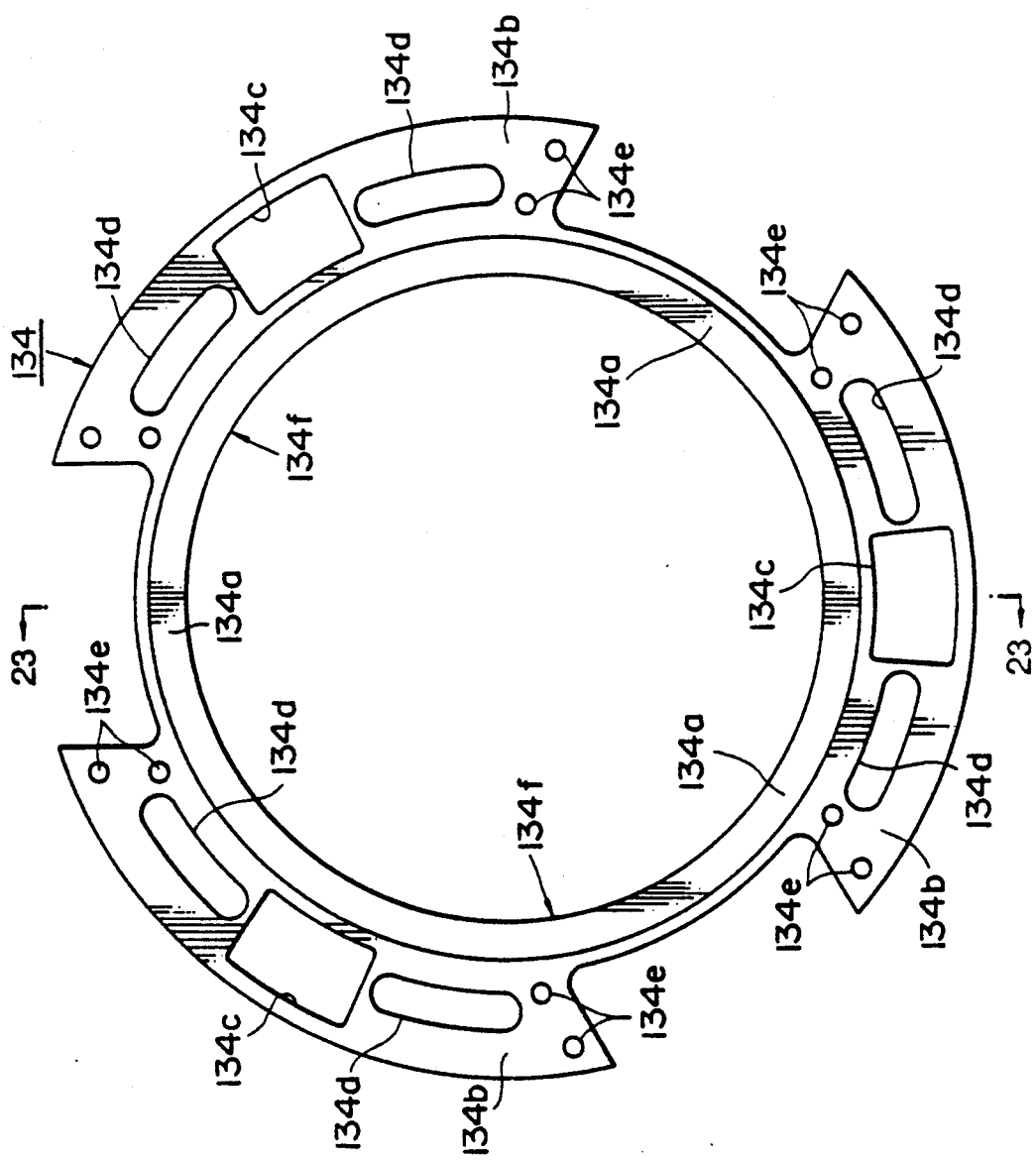

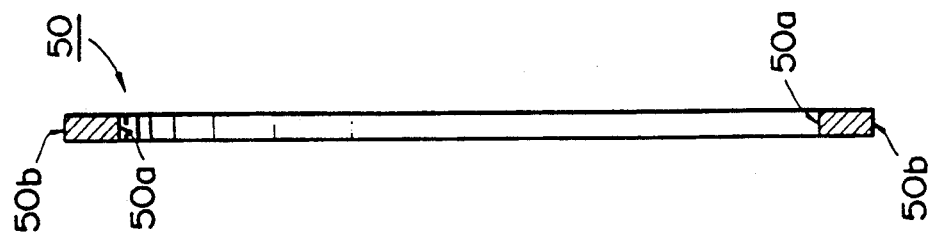
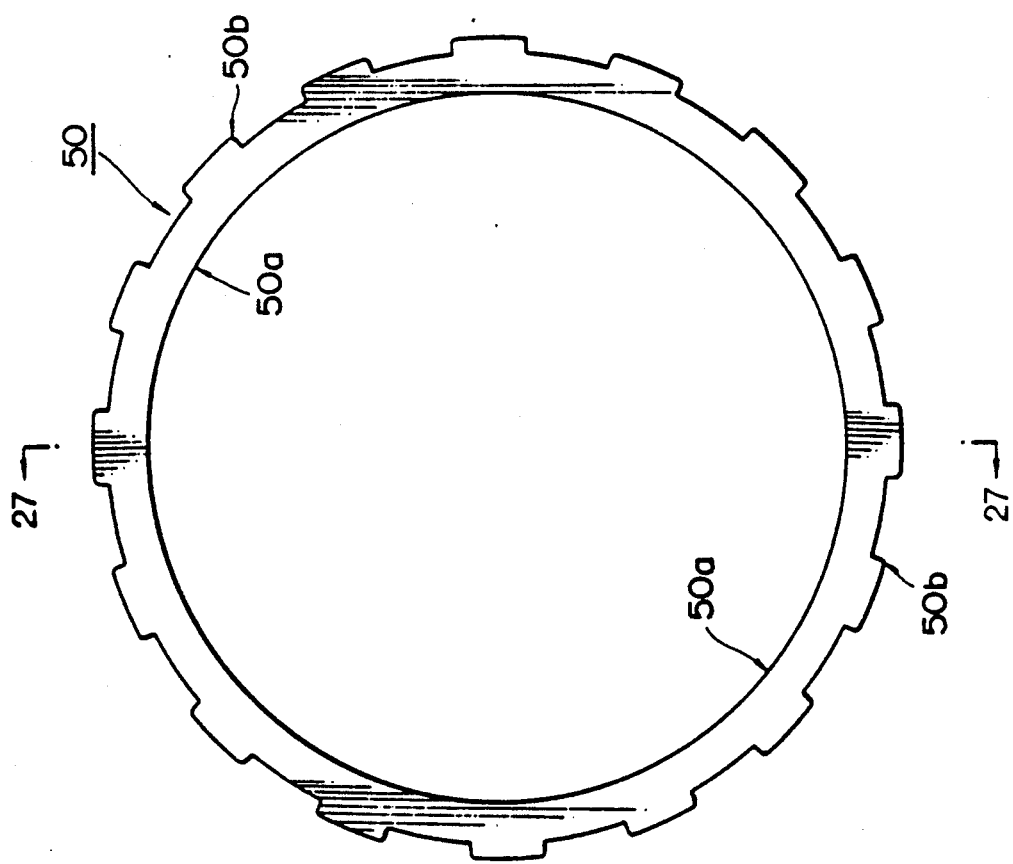

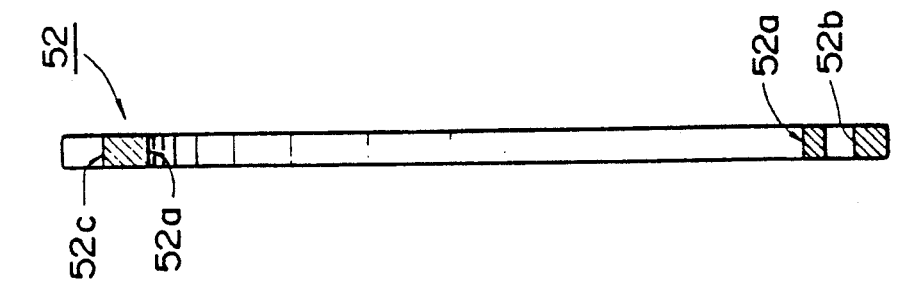
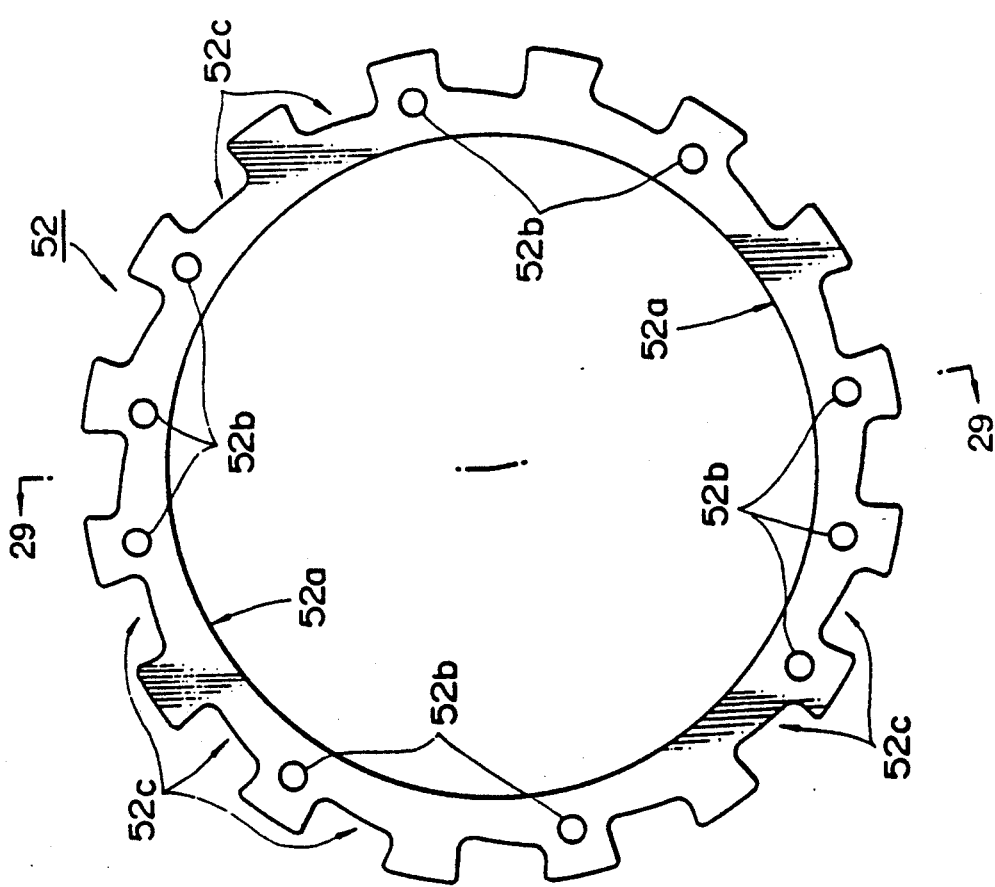

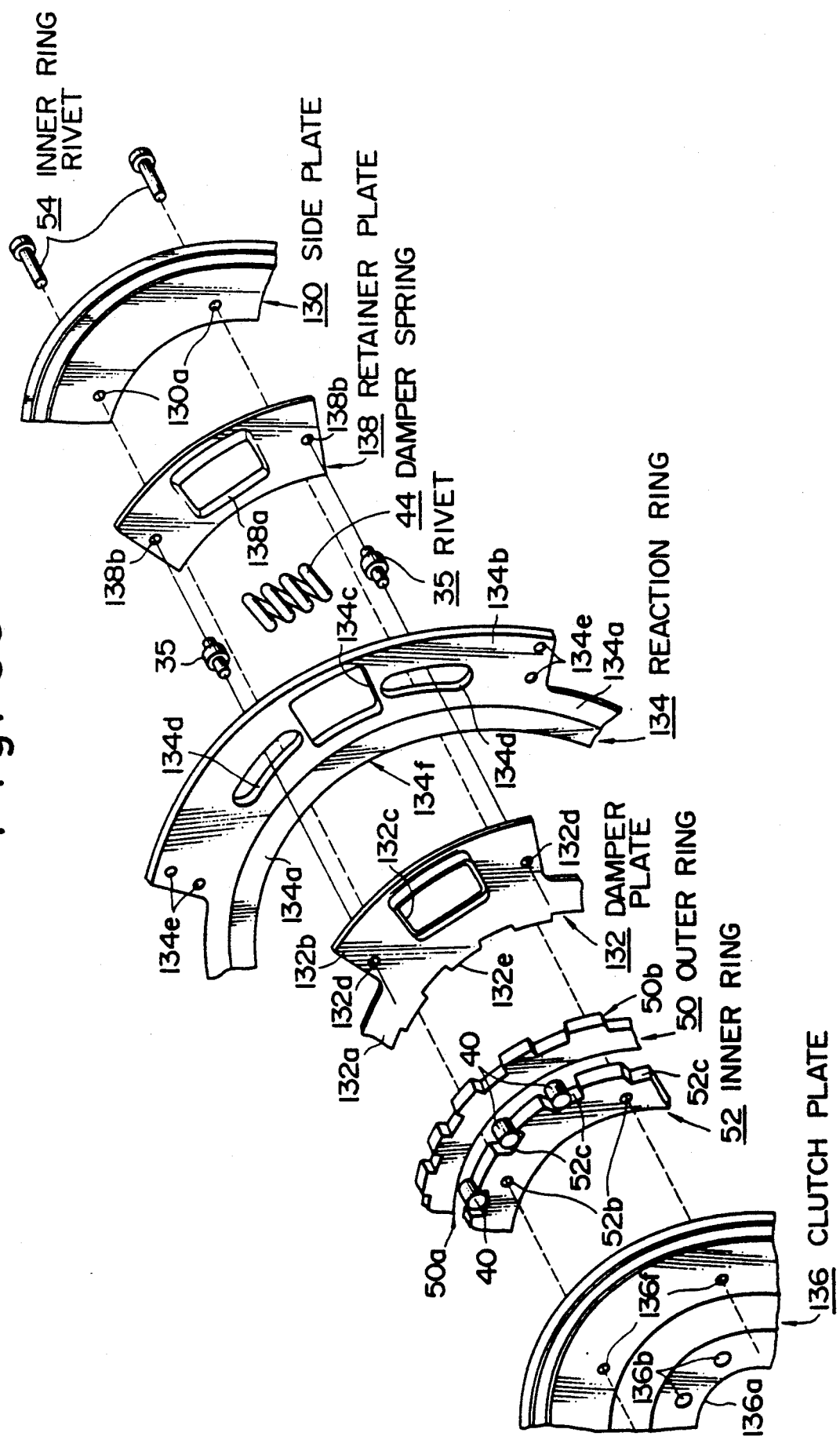

SPEED RESPONSIVE ONE-WAY CENTRIFUGAL CLUTCH

BACKGROUND OF THE INVENTION

1. Field of the Invention

This invention generally relates to a speed responsive centrifugal clutch which operates depending on the centrifugal force which in turn varies in accordance with the speed. More specifically, the present invention relates to a speed responsive one-way centrifugal clutch suitable for use as a lock-up clutch of a torque converter for transmission of rotation only in a specified direction.

2. Description of the Prior Art

In a torque converter, it is well known to use a lock-up clutch for mechanically coupling an input shaft of the driver side to an output shaft of the driven side through contact friction as the rotational speed increases to increase the centrifugal force. For example, as described in the Japanese Patent Laid-open Pub. No. 54-142459, such a lock-up clutch typically includes a shoe assembly which is moved radially outwardly to be finally brought into frictional contact with a surface of the driven side as the centrifugal force increases. In order to make the transmission of the driving force from the driving side to the driven side through the shoe assembly, it has been proposed to provide a damper; however, the provision of such a damper would tend to make the clutch as a whole larger in size. In order to cope with such a situation, there has been proposed to arrange a shoe assembly and a damper on the same circumference as disclosed in the Japanese Patent Laid-open Pub. No. 59-149617 which has been assigned to the assignee of this application and whose corresponding U.S. patent application has already issued as U.S. Pat. No. 4,690,257 which is hereby incorporated by reference.

On the other hand, such a speed responsive centrifugal clutch is often used in combination with a one-way clutch. However, in accordance with the prior art, a speed responsive centrifugal clutch and a one-way clutch are simply arranged side-by-side along a shaft, which tends to make the entire structure larger in size and difficult to manufacture and operate. Moreover, the increased space is required for installing such a combined structure. Particularly, in the case where such a combined structure is to be used in a torque converter, since the size of the clutch is already large, the size of the one-way clutch becomes relatively larger so that difficulty in designing will be encountered in making the width of the combined structure smaller.

SUMMARY OF THE INVENTION

In accordance with the present invention, there is provided a speed responsive centrifugal clutch including a one-way clutch, which can be advantageously used as a fluid coupling, such as a torque converter, and a centrifugal clutch, for example, for use in automobiles, industrial vehicles, construction vehicles, two-wheeled vehicles and various other vehicles.

In accordance with one embodiment of the present invention, there is provided a speed responsive one-way centrifugal clutch, comprising: a clutch plate which is approximately circular in shape and fixedly attached to a rotating shaft; a damper plate which is supported to be rotatable relative to said clutch plate; a reaction ring which is supported to be rotatable over a predetermined angle range relative to said damper plate; and a plurality of shoe assemblies which are supported by said reaction ring and displasable radially outwardly due to centrifugal forces applied thereto, whereby a one-way clutch is disposed between said clutch plate and said damper plate. In this manner, in accordance with the present invention, a one-way clutch is disposed between the clutch and damper plates of a speed responsive centrifugal clutch to provide a one-way clutch function in the speed responsive centrifugal clutch. With such a novel structure, a significant increase in the size of the overall structure is prevented and there can be provided a speed responsive one-way clutch centrifugal clutch capable of transmitting rotation only in one direction while maintaining the overall size comparable to that of a conventional lock-up clutch.

In a speed responsive one-way centrifugal clutch of the present invention, as the rotating speed increases, the shoe assemblies are brought into mechanical contact with a driver due to centrifugal forces so that the rotating force is transmitted directly from the driver to the shoe assemblies. In this case, the rotating force is first transmitted from the shoe assemblies to the reaction ring, to the damper plate via the damper (preferably, spring) and then to the clutch plate through a one-way clutch structure. The clutch plate is fixedly attached to a rotating shaft, such as a turbine hub, and, thus, the rotating force is transmitted to the rotating shaft (e.g., turbine hub) directly from the shoe assemblies through mechanical contact between the shoe assemblies and the driver. On the other hand, when the rotating speed of the driver decreases, an idling condition is established at the one-way clutch since the one-way clutch is disposed between the damper plate and the clutch plate.

It is therefore a primary object of the present invention to provide a speed responsive one-way centrifugal clutch which can transmit rotation only in one direction.

Another object of the present invention is to provide a speed responsive one-way centrifugal clutch having an integrated structure as a combination of a speed responsive centrifugal clutch and a one-way clutch.

A further object of the present invention is to provide a speed responsive one-way centrifugal clutch which is smooth in clutching operation.

A still further object of the present invention is to provide a speed responsive one-way centrifugal clutch which is compact in size.

Other objects, advantages and novel features of the present invention will become apparent from the following detailed description of the invention when considered in conjunction with the accompanying drawings.

BRIEF DESCRIPTION OF THE DRAWINGS

FIG. 4 is a schematic illustration showing in plan view a side plate of the lock-up clutch shown in FIG. 3;

FIG. 5 is a schematic illustration showing the side plate in cross section taken along 5—5 line indicated in FIG. 4;

FIG. 18 is a schematic illustration showing in plan view a side plate of the lock-up clutch shown in FIG. 15;

FIG. 19 is a schematic illustration showing the side plate in cross section taken along 19—19 line indicated in FIG. 18;

FIG. 20 is a schematic illustration showing in plan view a damper plate of the lock-up clutch shown in FIG. 15;

FIG. 21 is a schematic illustration showing the damper plate in cross section taken along 21—21 line indicated in FIG. 20;

FIG. 22 is a schematic illustration showing in plan view a reaction ring of the lock-up clutch shown in FIG. 15;

FIG. 23 is a schematic illustration showing the reaction ring in cross section taken along 23—23 line indicated in FIG. 22;

FIG. 26 is a schematic illustration showing in plan view an outer ring of the lock-up clutch shown in FIG. 15;

FIG. 27 is a schematic illustration showing the outer ring in cross section taken along 27—27 line indicated in FIG. 26;

FIG. 28 is a schematic illustration showing in plan view an inner ring of the lock-up clutch shown in FIG. 15;

FIG. 29 is a schematic illustration showing the inner ring in cross section taken along 29—29 line indicated in FIG. 28;

FIG. 30 is a schematic illustration showing in exploded, perspective view the assembled condition of each of the elements shown in FIGS. 16 through 29.

DESCRIPTION OF THE PREFERRED EMBODIMENTS

Figure 1:
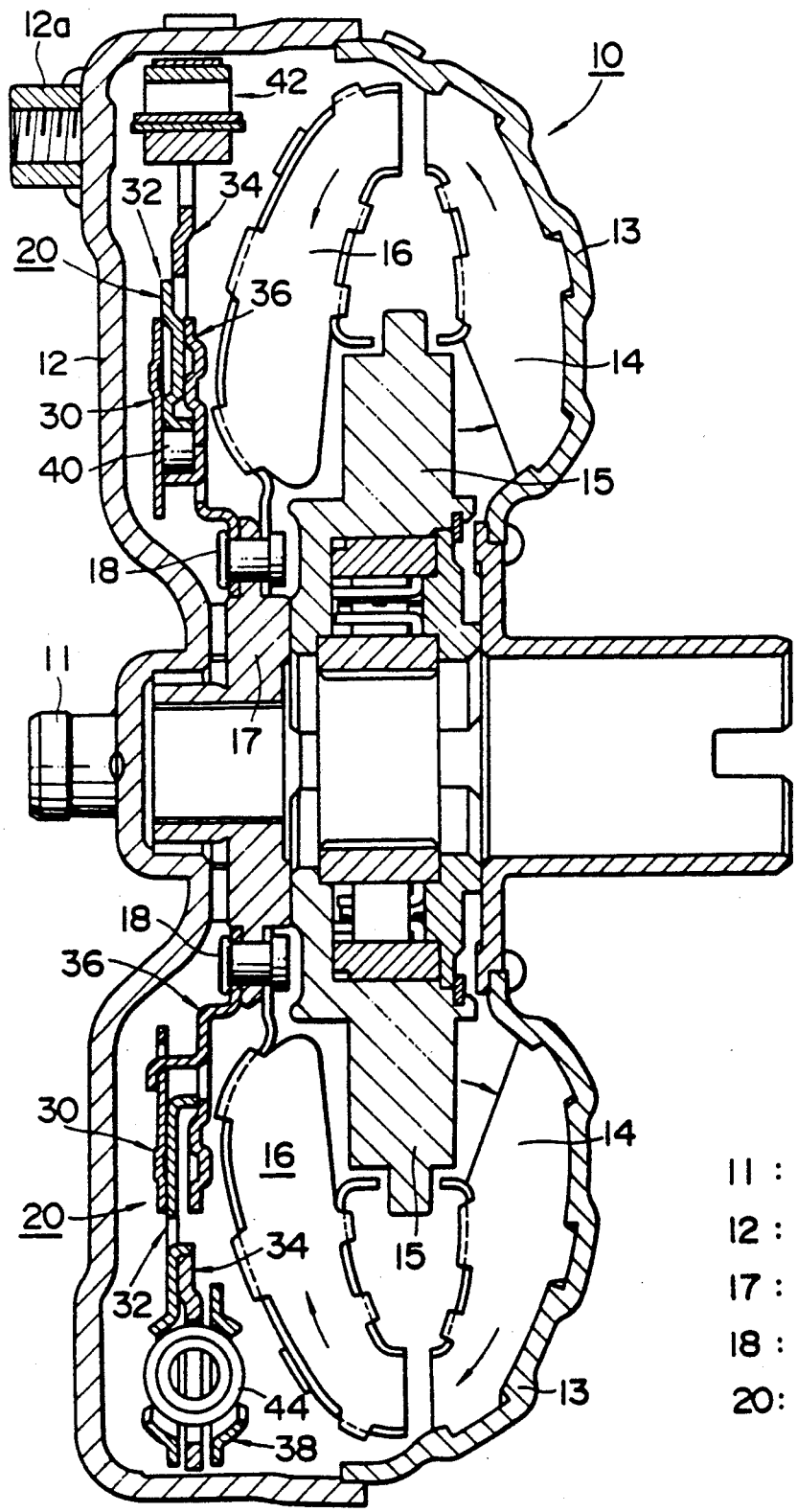
FIG. 1 is a schematic illustration showing in cross section a torque converter incorporating a speed responsive one-way centrifugal clutch constructed in accordance with one embodiment of the present invention.

Referring now to FIG. 1, there is schematically shown in cross section a speed responsive one-way centrifugal clutch constructed in accordance with one embodiment of the present invention in the case where the present clutch is used as a lock-up clutch of a torque converter 10. As shown, the torque converter 10 includes an input shaft 11 which defines a driver or driving side and a cover 12 is provided integrally with the input shaft 11. The cover 12 is operatively coupled to a prime mover, such as an internal combustion engine, through an appropriate number of projections 12a integrally formed on the cover 12. A casing 13 is also provided integrally with the cover 12. A pump impeller 14 is fixedly attached to the casing 13. Thus, when the cover 12 is driven to rotate, both of the casing 13 and the pump impeller 14 are driven to rotate in unison. The torque converter also includes a turbine impeller 16, which is driven to rotate by the working fluid which is forced to flow in the direction indicated in FIG. 1, and a stator 15. The turbine impeller 16 is fixedly attached to the turbine hub 17 by means of rivets 18. The turbine hub 17 serves as an output shaft and is operatively coupled to a turbine shaft, which defines a member to be driven.

With the above-described structure, the cover 12 on the driving side and the turbine hub 17 on the driven side are operatively coupled through the working fluid so that the rotating driving force is transmitted from the cover 12 to the turbine hub 17. The torque converter 10 shown in FIG. 1 is also provided with a lock-up clutch 20 which establishes a coupling between the driving side and the driven side through mechanical contact as the rotating speed increases. Described more in detail in this respect, the lock-up clutch 20 includes a clutch plate 36 which is approximately circular in shape and which is fixedly attached to the turbine hub 17 by means of rivets 18. A side plate 30 is disposed at a predetermined distance separated from the clutch plate 36 and the side plate 30 is fixedly attached to the clutch plate 36. In the space defined between the clutch plate 36 and the side plate 30 is disposed a damper plate 32 as being rotatable relative to the plates 30 and 36.

As described more in detail later, as one feature of the present invention, a one-way clutch is disposed between the damper plate 32 and the clutch plate 36, so that the damper plate 32 can rotate only in a predetermined direction relative to the clutch plate 36. In the case of the illustrated embodiment, a plurality of rollers 40 are provided and these rollers 40 are set clamped between the damper plate 32 and the clutch plate 36 or free to thereby provide a one-way clutch operation. Moreover, a reaction ring 34 is provided to be rotatable over a predetermined angle range relative to the damper plate 32 and the reaction ring 34 is provided with a plurality of shoe assemblies 42 as arranged in the circumferential direction.

The shoe assemblies 42 are provided such that they can project radially outwardly relative to the reaction ring 34, and, thus, when the turbine impeller 16, and, thus, the clutch plate 36 increase their rotating speed to thereby increase the centrifugal force applied to the shoe assemblies 42, they are projected radially outwardly so that linings 42e provided at the top of the shoe assemblies 42 are brought into frictional contact with the inner surface of the cover 12, whereby a mechanical coupling is established between the cover 12 and the output shaft 17. In this case, the cover 12 is mechanically coupled to the turbine hub 17 through the shoe assemblies 42 in frictional contact with the cover 12 and the rollers 40 defining the core of the one-way clutch mechanism, and the one-way clutch mechanism is in its coupled condition so that the rollers 40 are maintained as clamped between the damper plate 32 and the clutch plate 36. On the other hand, as the rotating speed decreases, since the shoe assemblies 42 are normally biased radially inwardly by the recovery force of springs, the shoe assemblies 42 gradually move radially inwardly by overcoming the centrifugal force so that the linings 42e are separated away from the inner surface of the cover 12 to thereby release the frictional contact condition.

In this case, as the rotating speed decreases, if the cover 12 tends to rotate in the opposite direction relative to the turbine hub 17, the one-way clutch mechanism including the rollers 40 are set in its decoupled condition, and, thus, the mechanical coupling between the shoe assemblies 42 and the turbine hub 17 is released. Accordingly, even if a decrease of the rotating speed were relatively rapid, the one-way clutch mechanism including the rollers 40 would become operative to release the mechanical contact between the shoe assemblies 42 and the turbine hub 17 so that rapid changes in load at the input shaft 11 of the input side can be prevented from being directly transmitted to the turbine hub 17 of the output side.

As shown in the bottom half of FIG. 1, the damper plate 32 is provided between and rotatably relative to the clutch plate 36 and the side plate 30. A plurality of damper springs 44 are disposed at predetermined locations in the circumferential direction of the damper plate 32. In the illustrated embodiment, damper springs 44 are comprised of coil springs and they are maintained in position by the reaction ring 34 and retainer plates 38. As described later, damper springs 44 do not have to be springs and they may be comprised of any desired springy or elastic material, such as rubber. As described more in detail later, the damper springs 44 are maintained between the damper plate 32 and the reaction ring 34 by means of associated retainer plates 38 and, thus, when the linings 42e of the shoe assemblies 42 are brought into contact with the cover 12 so that the rotating force is transmitted from the cover 12 to the reaction ring 34 through the shoe assemblies 42 the rotating force is transmitted from the reaction ring 34 to the damper plate 32 via the damper springs 44 instead of being directly transmitted to the damper plate 32. In the case when rotated in a predetermined direction, the rotating force transmitted to the damper plate 32 is transmitted to the turbine hub 17 through the rollers 40 and clutch plate 36. With this structure, even when the rotating force is transmitted from the cover 12 to the turbine hub 17 through a direct mechanical coupling, the transmission of the rotating drive force can be carried out extremely smoothly. That is, the rotating force is transmitted from the cover 12 (input shaft 11) to the turbine hub 17 through the shoe assemblies 42, reaction ring 34, damper spring 44, damper plate 32, rollers 40 and clutch plate 36. In this case, when the rotating speed increases to bring the shoe assemblies 42 in frictional contact with the cover 12, the impact at the time of contact is absorbed by the damper springs 44 so that transmission of the rotating force from the cover 12 to the turbine hub 17 can be extremely smooth. On the other hand, when the rotating speed of the input shaft 11 and thus the cover 12 decreases rapidly from the so-called lock-up condition in which the shoe assemblies 42 are in frictional contact with the cover 12 for some reason, since the shoe assemblies 42 are in contact with the cover 12, the shoe assemblies 42, the reaction ring 34 supporting the shoe assemblies 42, the damper spring 44 supported by the reaction ring 34, and the damper plate 32 all tend to rotate in unison. However, due to rotation of the damper plate 32 in this case, the rollers 40 are set in the idling or free condition to thereby have the one-way clutch set in its decoupled condition, so that the rotating force is prevented from being transmitted to the clutch plate 36 and the turbine hub 17. Therefore, the driving side including the shoe assemblies 42, reaction ring 34, damper spring 44 and damper plate 32 is decoupled from the driven side including the clutch plate 36 and turbine hub 17 by the one-way clutch including rollers 40, so that the driving and driven sides are set freely rotatable relative to each other. Thus, even if the rotating speed rapidly decreases at the input shaft 11 for some reason, it is prevented from being directly transmitted to the turbine hub 17, thereby insuring a smooth rotating force transmission function.

As will be made clear later, in the present embodiment, the damper springs 44 and the shoe assemblies 42 are arranged on the same circular circumference. As can be clearly seen from FIG. 1, since the damper springs 44 and the shoe assemblies 42 are both relatively large in cross sectional size, such arrangement of damper springs 44 and shoe assemblies 42 on the same circular circumference, i.e., approximately along the outer periphery of the reaction ring 34 in the present embodiment, can allow to reduce the overall size of the apparatus, in particular the size in the axial direction. Moreover, as shown in FIG. 1, in accordance with the present invention, the one-way clutch mechanism comprised of rollers 40 is arranged approximately concentrically with the circular circumference along which the shoe assemblies 42 and the damper springs 44 are arranged, so that although the present clutch apparatus provides a speed responsive centrifugal clutch provided with a one-way clutch function, it is to be noted that the overall apparatus is made compact in size.

Figure 2:
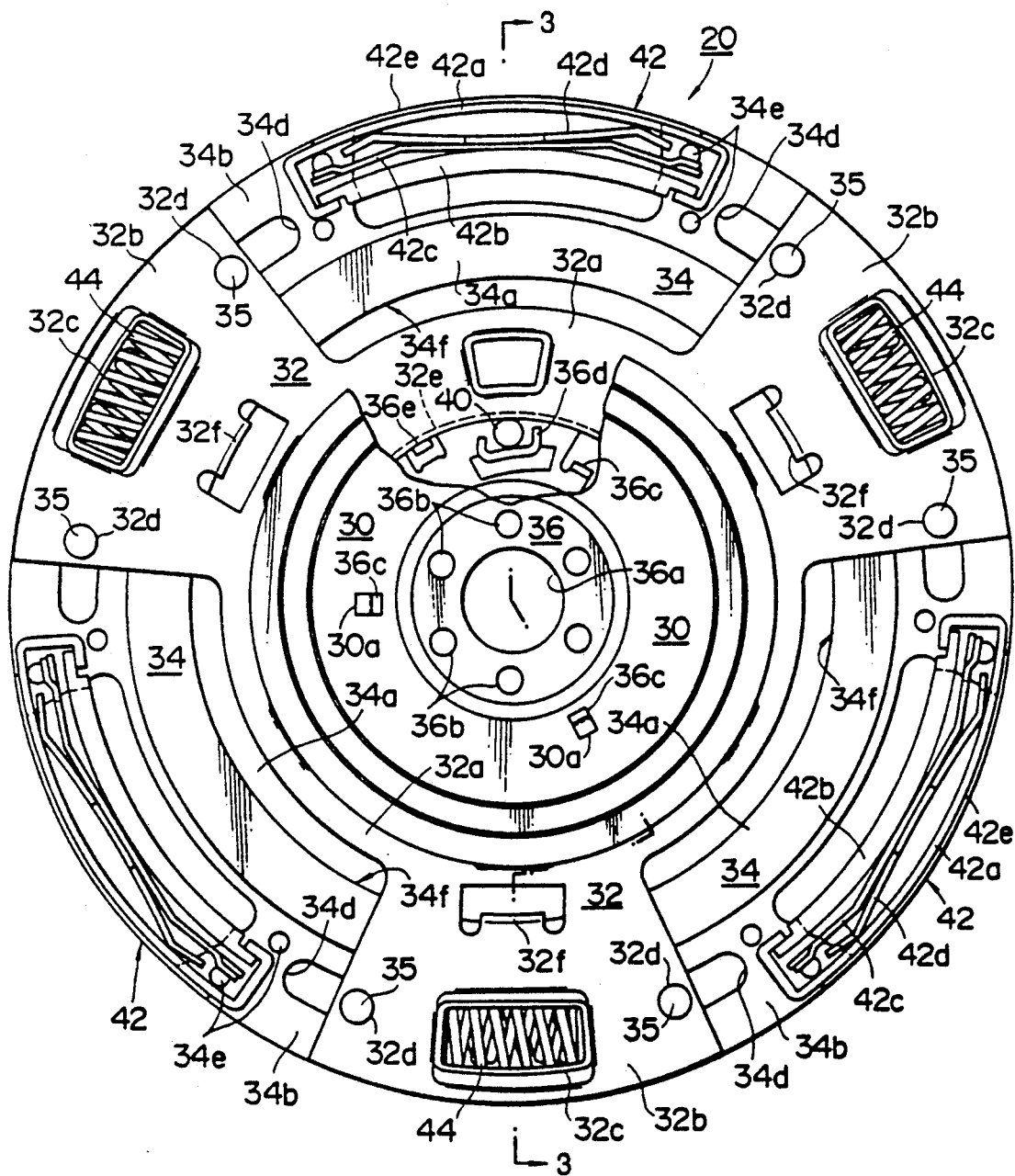
FIG. 2 is a schematic illustration showing the assembled condition of the clutch provided in the torque converter shown in FIG. 1.
Figure 3:
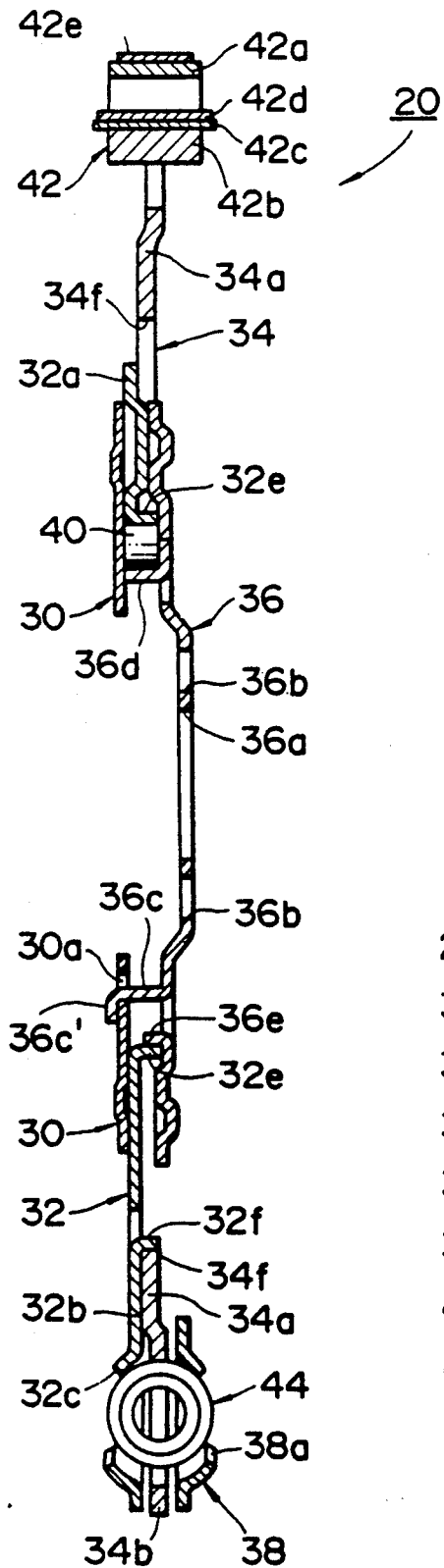
FIG. 3 is a schematic illustration showing in cross section taken along 3—3 line indicated in FIG. 2 a lock-up clutch constructed in accordance with one embodiment of the present invention and provided in the torque converter shown in FIG. 1.

FIG. 2 schematically shows the assembled condition of the lock-up clutch 20 provided in the torque converter 10 and FIG. 3 schematically shows the lock-up clutch 20 in cross section taken along III—III line indicated in FIG. 2. As shown in FIGS. 2 and 3, the lock-up clutch 20 includes a clutch plate 36, rollers 40, a side plate 30, a damper plate 32, a reaction ring 34, damper springs 44, retainer plates 38 and shoe assemblies 42.

Figure 11:
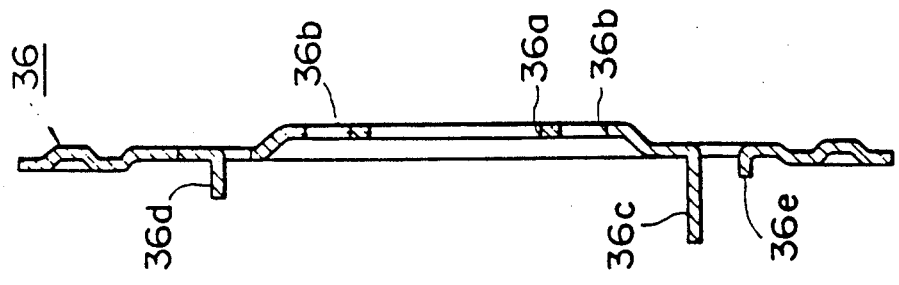
FIG. 11 is a schematic illustration showing the clutch plate in cross section taken along 11—11 line indicated in FIG. 10.
Figure 10:
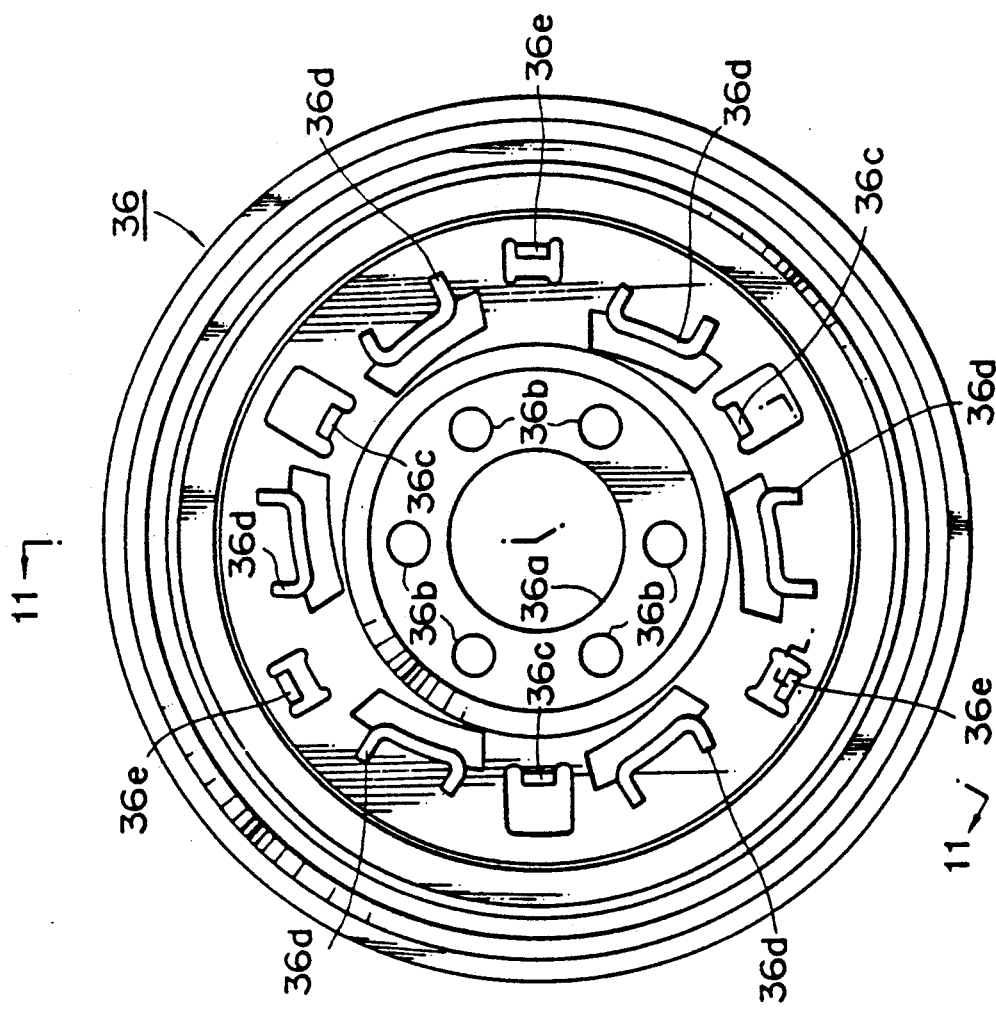
FIG. 10 is a schematic illustration showing in front view a clutch plate of the lock-up clutch shown in FIG. 3.

As shown in FIG. 1, the clutch plate 36 is fixedly attached to the turbine hub 17, which defines an output shaft of the apparatus, through rivets or pins 18 and its detailed structure is shown in FIGS. 10 and 11. That is, the clutch plate 36 is approximately disc-shaped and provided with a center hole 36a into which the turbine hub 17 is fitted. The clutch plate 36 is also provided with a plurality of mounting holes 36b around the center hole 36a for rivets 18 to be inserted. The clutch plate 36 is also provided with a plurality (3 in the illustrated embodiment) of first projections 36c which are arranged on the same circular circumference and which are bent approximately upright from the surface of the clutch plate 36. In the illustrated embodiment, these first projections 36c are formed by cutting portions of the clutch plate 36 and having them bent in a predetermined direction. As will be described later, these first projections 36c are used for forming an integrated connection between the clutch plate 36 and the side plate 30.

Furthermore, the clutch plate 36 is formed with a plurality (6 in the illustrated embodiment) of roller holding sections 36d along the same circular circumference. In the illustrated embodiment, these roller holding sections 36d are also formed by cutting portions of the clutch plate 36 and bending them in a predetermined manner. Each of the roller holding sections 36d has a generally U-shaped cross section and its bottom portion is formed inclined at a predetermined angle with respect to the same circular circumference to thereby provide a predetermined cam surface. That is, as may be seen clearly from FIG. 2, each of the roller holding sections 36d holds a roller 40 such that the roller 40 can roll over a predetermined range of angles, and when the roller 40 is located at one end of the roller holding section 36d, the roller 40 is located at its radially most outward position; whereas, when the roller 40 is located at the opposite end of the roller holding section 36d, the roller 40 is located at its radially most inward position. As will be described later, the roller 40 held in each of the roller holding sections 36d may be brought into rolling contact with the inner surface 32e of the damper plate 32, and, thus, the roller holding sections 36d of the clutch plate, rollers 40 and the inner peripheral surface 32e of the damper plate 32 together define a one-way clutch mechanism.

The clutch plate 36 is also provided with a plurality (3 in the illustrated embodiment) of second projections 36e arranged along the same circular circumference. These second projections 36e are also formed by cutting portions of the clutch plate 36 and bending the cut portions approximately in a direction perpendicular to the surface of the clutch plate 36. The positions of these second projections 36e along a circular circumference along which the second projections 36e are arranged are such that they can slidably guide the inner peripheral surface 32e of the damper plate 32. That is, when the rollers 40 are in their unconstrained condition, these second projections 36e guide the inner peripheral surface 32e of the damper plate 32 to thereby provide a relative rotation between the clutch plate 36 and the damper plate 32 in a predetermined direction. On the other hand, if the relative rotation between the clutch plate 36 and the damper plate 32 is in the opposite directions, the rollers 40 become clamped between the roller holding sections 36d and the inner peripheral surface 32e of the damper plate 32, so that the damper plate 32 and the clutch plate 36 rotate in unison.

The side plate is provided as separated from the clutch plate 36 over a predetermined distance in the axial direction and is fixedly attached to the clutch plate 36. The detailed structure of the side plate 30 is shown in FIGS. 4 and 5. That is, the side plate 30 is also approximately circular in shape and provided with a predetermined hole at its center. The side plate 30 is provided with a plurality (3 in the illustrated embodiment) of mounting holes 30a as spaced apart from each other in the circumferential direction. These mounting holes 30a are in positional alignment with the first projections 36c of the clutch plate 36. Thus, as shown in FIGS. 2 and 3, in the assembled condition, the first projections 36c of the clutch plate 36 are inserted in the respective mounting holes 30a of the side plate 30. As shown in FIG. 3, typically, tip ends 36c' of the first projections 36c are bent, for example, by calking in order to make the side plate 30 fixedly attached to the clutch plate 36. Accordingly, there is formed an annular space between the side plate 30 and the clutch plate 36.

Figure 7:
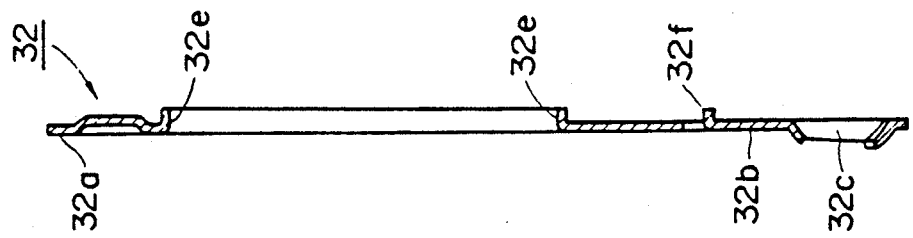
FIG. 7 is a schematic illustration showing the damper plate in cross section taken along 7—7 line indicated in FIG. 6.
Figure 6:
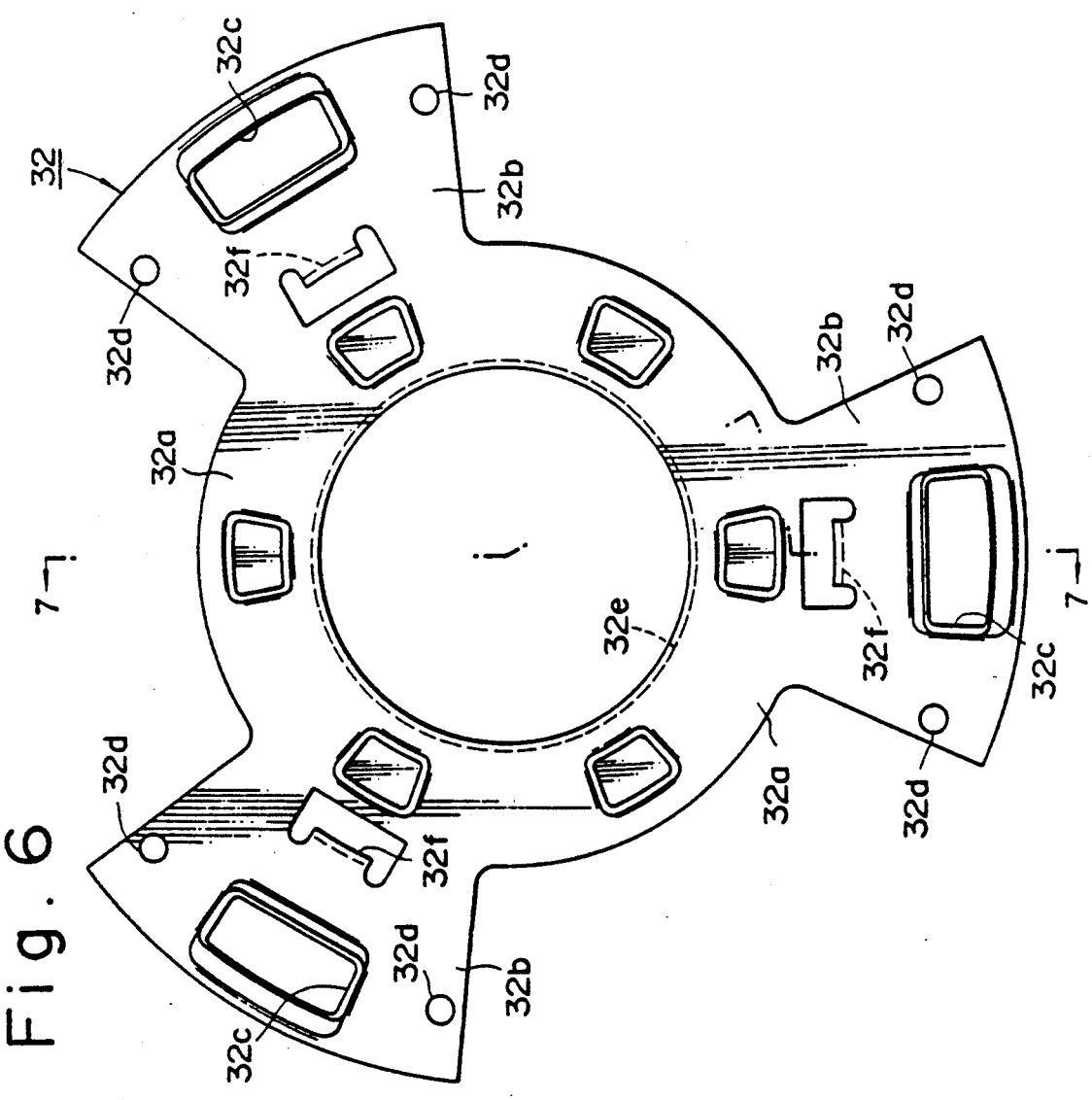
FIG. 6 is a schematic illustration showing in front view a damper plate of the lock-up clutch shown in FIG. 3.

The lock-up clutch 20 further includes a damper plate 32 and its detailed structure is shown in FIGS. 6 and 7. As shown, the damper plate 32 generally includes a ring-shaped section 32a and a plurality (3 in the illustrated embodiment) of projections 32b which project from the ring-shaped section 32a radially outwardly. As will be described more in detail later, each of the projections 32b is provided for supporting the corresponding damper spring 44. A space is defined between two adjacent projections 32b, 32b and a shoe assembly 42 to be described later is disposed in this space. The damper plate 32 is provided with a center opening having a predetermined diameter at its center and an inner peripheral surface 32e of the damper plate 32 is defined at this center opening. As described previously, the inner peripheral surface 32e is set in sliding engagement with the plurality of second projections 36e of the clutch plate 36, and, therefore, as guided by these second projections 36e, the damper plate 32 is rotatable relative to the clutch plate 36. In addition, the inner peripheral surface 32e of the damper plate 32 defines an outer peripheral surface of the one-way clutch mechanism, so that it can establish a rolling contact with the rollers 40 held within the roller holding sections 36d. Therefore, in the case where the damper plate 32 rotates clockwise in FIG. 2 relative to the clutch plate 36, the damper plate 32 and the clutch plate 36 are clamped by the rollers 40 so that both of the plates 32 and 36 rotate in unison. On the other hand, in the case where the damper plate 32 rotates counterclockwise in FIG. 2 relative to the clutch plate 36, the rollers 40 are set unconstrained so that the damper plate 32 is operatively decoupled from the clutch plate 36 and can rotate freely in the counterclockwise direction.

The damper plate 32 is also provided with a plurality (3 in the illustrated embodiment) of third projections 32f arranged along the same circular circumference. In the illustrated embodiment, these third projections 32f are formed by cutting portions of the damper plate 32 and bending these cut portions in a direction substantially perpendicular to the surface of the damper plate 32. These third projections 32f serve to guide the inner peripheral surface 34f of the reaction ring 34 described later. Moreover, a window 32c is formed in each of the projections 32b of the damper plate 32, and when assembled, a corresponding damper spring 44 is partly received in the window 32c. A pair of pin holes 32d is formed in each of the projections 32b. As will be described later, these pin holes 32d serve as mounting holes for mounting a retainer plate 38 to the damper plate 32 by means of a pin or rivet 35.

Figure 9:
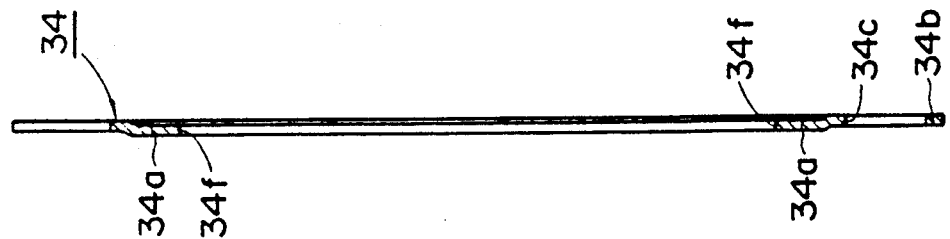
FIG. 9 is a schematic illustration showing the reaction ring in cross section taken along 9—9 line indicated in FIG. 8.
Figure 8:
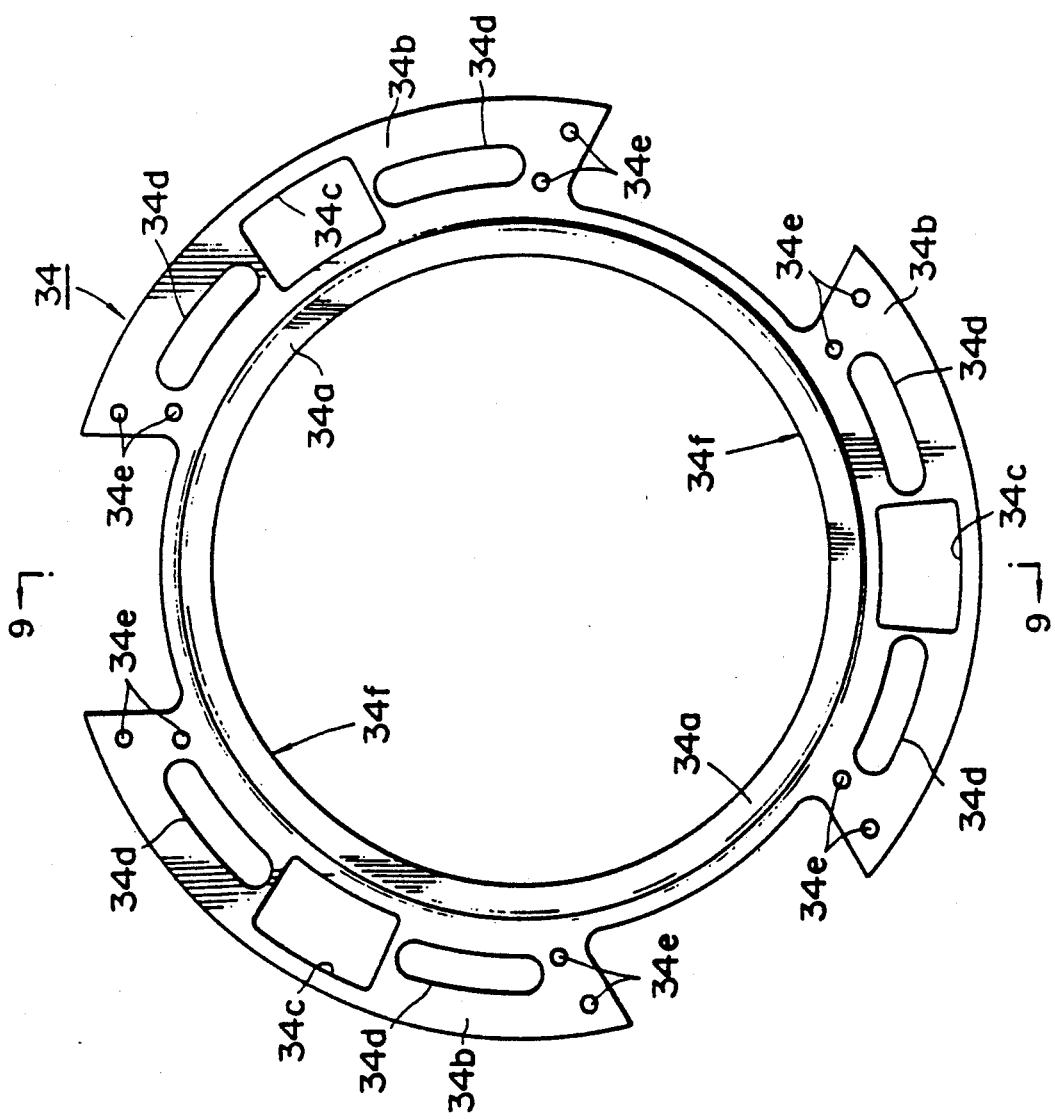
FIG. 8 is a schematic illustration showing in front view a reaction ring of the lock-up clutch shown in FIG. 3.

The lock-up clutch 20 also includes a reaction ring 34 which is provided to be rotatable over a predetermined angle range relative to the damper plate 32, and its detailed structure is shown in FIGS. 8 and 9. As shown in FIGS. 8 and 9, the reaction ring 34 is generally ring-shaped, and similarly with the before-described damper plate 32, it includes a ring-shaped section 34a and a plurality (3 in the illustrated embodiment) of projections 34b which project radially outward from the ring-shaped section 34a. The inner side of the ring-shaped section 34a of the reaction ring 34 defines an inner peripheral section 34f which is brought into sliding contact with the plurality of third projections 32f of the damper plate 32. Accordingly, as guided by these third projections 32f of the damper plate 32, the reaction ring 34 is rotatably supported relative to the damper plate 32.

Each of the projections 34b of the reaction ring 34 is provided with a damper spring mounting opening 34c approximately at its center and the damper spring 44 is supported as being fitted into this mounting opening 34c. An arc-shaped slot 34d is provided on opposite sides of the mounting opening 34c. A pin or rivet 35 (see FIG. 14) for fixedly attaching the retainer plate 38 to the damper plate 32 extends through the corresponding slot 34d. Since the rivet 35 extends through the slot 34d, the relative rotation between the damper plate 32 and the reaction ring 34 is limited to the scope of relative rotation between the rivet 35 and the slot 34d through which the rivet 35 extends. Moreover, each of the projections 34b of the reaction ring 34 is formed with a pair of shoe assembly mounting holes 34e at its side end. That is, as shown in FIG. 2, a shoe assembly 42 is disposed in the space defined between two adjacent projections 34b of the reaction ring 34, and the shoe assembly 42 is maintained in the corresponding position by means of mounting pins (not shown) fitted into the mounting holes 34e. The shoe assembly 42 is mounted to be movable radially outwardly with respect to the reaction ring 34. That is, the shoe assembly 42 can move radially relative to the reaction ring 34 depending on the magnitude of the centrifugal force acting thereon, and when it moves radially outward due to a large centrifugal force acting thereon, it finally reaches an advanced position where it physically contacts the inner peripheral surface of the cover 12 to establish a frictional contact condition or lock-up condition. On the other hand, if the shoe assembly 42 receives very little centrifugal force, it takes a retracted position separated away from the cover 12 as shown in FIG. 2.

As shown in FIGS. 2 and 3, the shoe assembly 42 is generally arcuate in shape and it includes a lining 42e which may be brought into contact or separated away from the inner peripheral surface of the cover 12, a shoe 42a which securely holds the lining 42e, a weight 42b, a retractor spring 42c, and a main spring 42d. As described previously, the shoe assembly 42 is mounted at a predetermined position of the reaction ring 34 by means of pin (not shown) fixedly inserted into the shoe assembly mounting hole 34e of the reaction ring 34 so as to be movable in the radial direction. In the present embodiment, three of such shoe assembly 42 are arranged along a circular circumference as spaced apart from one another. The operation of such shoe assembly 42 may be better understood from a reading of the before-mentioned Japanese Pat. Laid-open Pub. No. 54-142459 and Japanese Pat. Appln. No. 59-149617.

Figure 12:
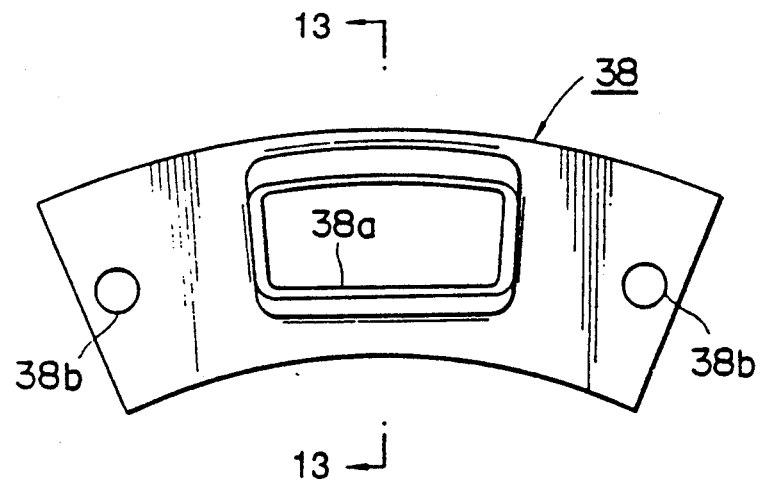
FIG. 12 is a schematic illustration showing in front view a retainer plate of the lock-up clutch shown in FIG. 3.
Figure 13:
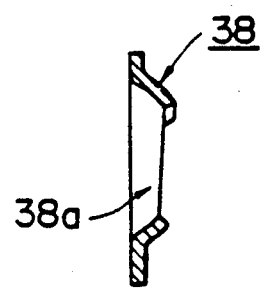
FIG. 13 is a schematic illustration showing the retainer plate in cross section taken along 13—13 line indicated in FIG. 12.

The lock-up clutch 20 also includes a retainer plate 38, the detailed structure of which is shown in FIGS. 12 and 13. As shown, the retainer plate 38 is generally arcuate in shape and there is provided one such retainer plate 38 corresponding to each of the projections 34b of the reaction ring 34. The retainer plate 38 is provided with a window 38a approximately at its center, and this window 38a is substantially similar in dimension and shape to the window 32c formed in the projection 32b of the damper plate 32. That is, the damper spring 44 is received in the damper spring mounting opening 34c of the reaction ring 34 with their center lines substantially aligned. Thus, the damper spring mounting opening 34c of the reaction ring 34 is set to be somewhat larger than the outer diameter of the damper spring 44. Thus, the damper spring 44 received in the mounting opening 34c may be compressed within the mounting opening 34c in the mounted condition. On the other hand, the windows 32c and 38a formed in the damper plate 32 and the retainer plate 38, respectively, are set smaller in size than the outer diameter of the damper spring 44. Thus, these windows 32c and 38a serve to hold the damper spring 44 located in the mounting opening 34c of the reaction ring 34 on both sides of the damper spring 44. Accordingly, as shown in FIGS. 7 and 13, these windows 32c and 38a or their inner peripheral portions are bent in a predetermined shape to be somewhat convergent toward the exterior.

Figure 14:
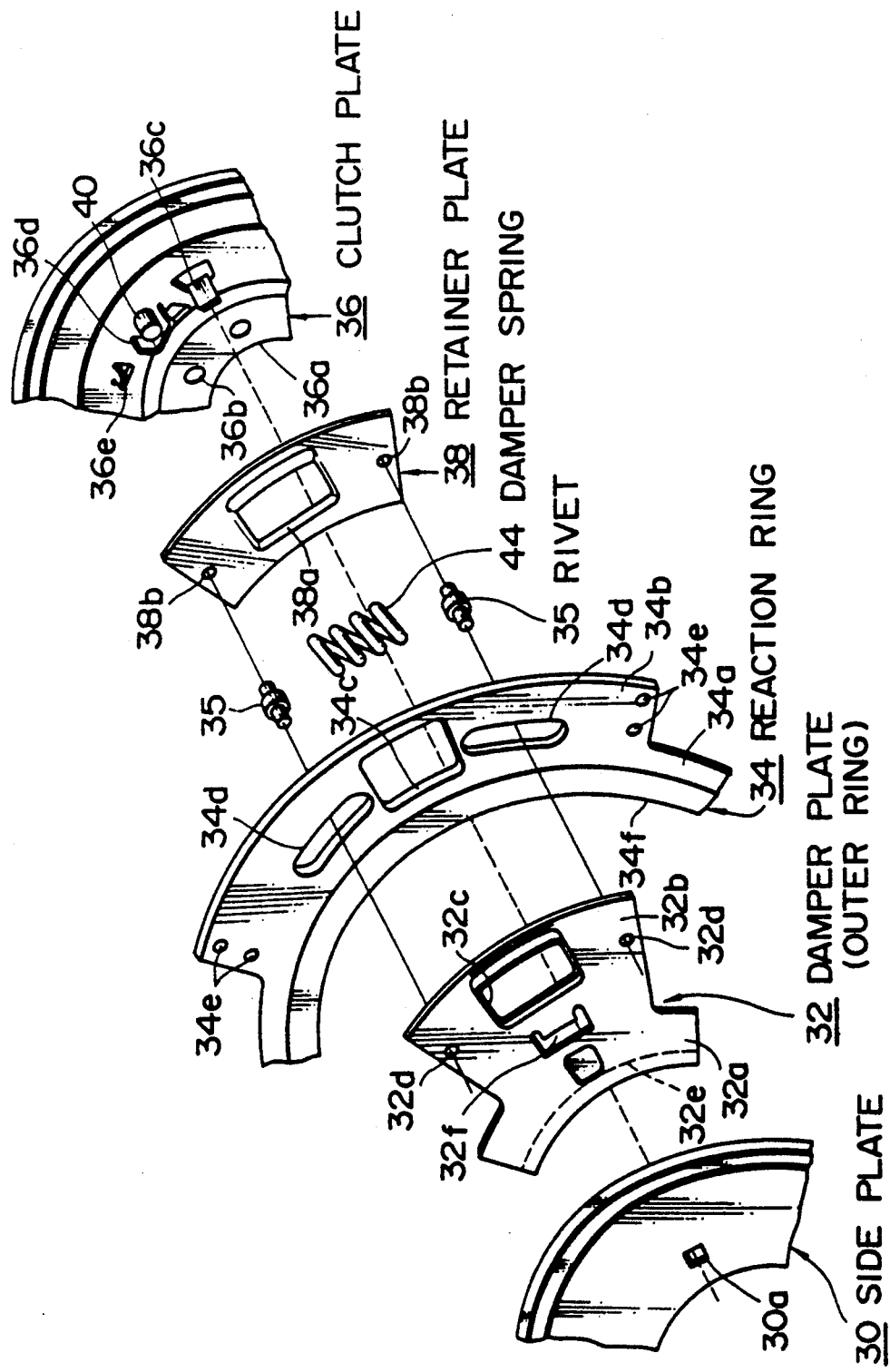
FIG. 14 is a schematic illustration showing in exploded, perspective view the assembled condition of each of the elements shown in FIGS. 4 through 13.
Figure 15:
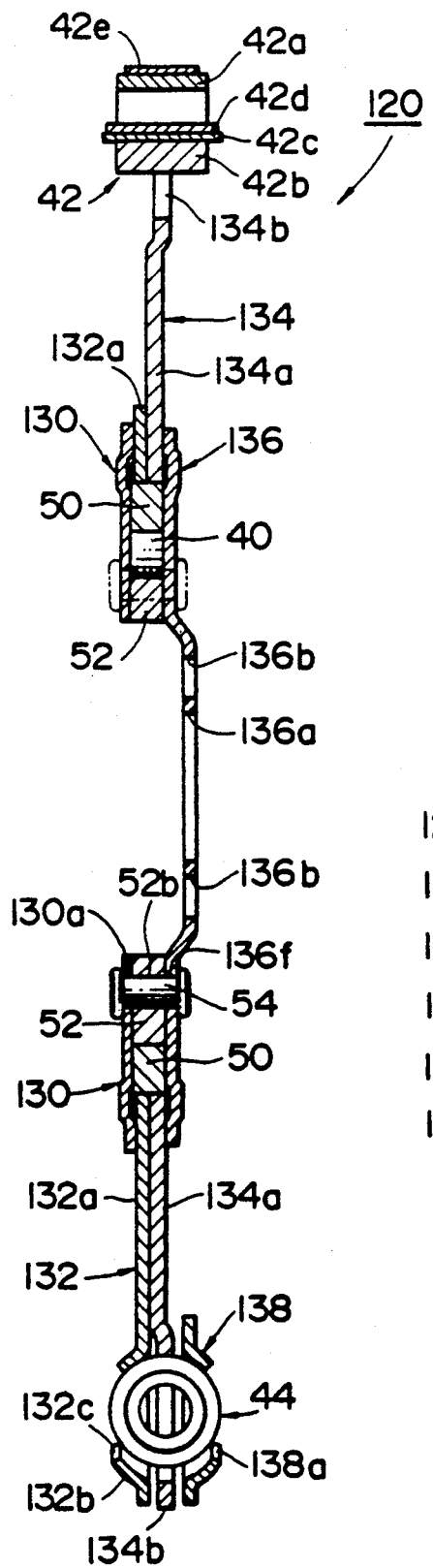
FIG. 15 is a schematic illustration showing in cross section a lock-up clutch constructed in accordance with another embodiment of the present invention.

The retainer plate 38 is also provided with a mounting hole 38b at each side thereof. As best shown in FIG. 14, the retainer plate 38 is fixedly attached to one end of a rivet or pin 35 extending through the corresponding slot 34d of the reaction ring 34, and the opposite end of the rivet 35 is inserted into and fixedly attached to a corresponding mounting hole 32d formed in the projection 32b of the damper plate 32. Thus, the retainer plate 38 is fixedly attached to the damper plate 32 by a pair of rivets 35. A reaction ring 34 is disposed between the retainer plate 38 and the damper plate 32 to thereby hold the damper spring 44 supported by the reaction ring 34 in position. The outer diameter of the damper spring 44 is so set that its end can engage not only the end of the mounting opening 34c of the reaction ring 34, but also the end of the window 32c of the damper plate 32 as well as the end of the window 38a of the retainer plate 38. Accordingly, when the reaction ring 34 tends to rotate relative to the damper plate 32, its rotation is resiliently transmitted to the damper plate 32 through the damper spring 44, so that the damper plate 32 rotates in unison with the reaction ring 34. However, a play is provided over a predetermined angle range defined by the amount of relative displacement between the rivet 35 and the slot 34d between the reaction ring 34 and the damper plate 32. Thus, when the reaction ring 34 initiates its rotation relative to the damper plate 32, only the damper spring 44 is compressed at first; however, when the damper spring 44 becomes sufficiently compressed, the rotating force of the reaction ring 34 is transmitted also to the damper plate 32 through the damper spring 44, under which condition, the rotating force of the reaction ring 34 is transmitted to the damper plate 32 through the damper spring 44, so that the damper plate 32 and the reaction ring 34 both rotate. In this manner, at the initiation of rotation of the reaction ring 34, the damper spring 44 serves as a damper to thereby make transmission of rotating force from the reaction ring 34 to the damper plate 32 smoother.

As described above, in the embodiment described above, a plurality of second projections 36e are provided in the clutch plate 36 to thereby define a circular path and the inner peripheral surface 32e of the damper plate 32 is slidably guided by these second projections 36e so that the damper plate 32 is provided to be rotatable relative to the clutch plate 36, whereas, a plurality of roller holding sections 36d are provided on the clutch plate 36 so that the rollers 40 provided in the respective roller holding sections 36d are clamped by the inner peripheral surface 32e of the damper plate 32 only when the damper plate 32 rotates in a predetermined direction to thereby prevent the occurrence of relative rotation between the damper plate 32 and the clutch plate 36. Accordingly, it is so structured that the damper plate 32 is rotatable freely only in a predetermined direction relative to the clutch plate 36 and the damper plate 32 is prevented from rotating in the opposite direction. Thus, the rollers 40, roller holding sections 36d and the inner peripheral surface 32e of the damper plate 32 together define a one-way clutch mechanism. As a feature of the present invention, the one-way clutch mechanism is substantially concentric with and located at substantially the same aixal position with a circular circumference defined by the arrangement of the damper springs 44 and the shoe assemblies 42. That is, the one-way clutch mechanism, damper springs 44 and shoe assemblies 42 are all located substantially on the same plane which extends perpendicular to the rotating axis of the clutch. Thus, although the present clutch apparatus has a damper function as well as a one-way clutch function, the overall structure is extremely compact in size. Moreover, in the above-described embodiment, the one-way clutch mechanism can be constructed simply by subjecting the clutch plate 36 and the damper plate 32 to a bending process and it is only the rollers 40 that are required as separate elements. Therefore, the resulting structure is extremely compact in overall size and manufacture is simple. Besides, the present invention also provides such advantages as reduction in the number of parts, low cost and enhanced rigidity in structure.

FIGS. 15 through 30 illustrate a clutch apparatus constructed in accordance with another embodiment of the present invention. The present embodiment has substantially the same basic structure as that of the previously described embodiment so that similar elements in the present embodiment are indicated by reference numerals defined by adding "100" to similar reference numerals used in the previous embodiment. The overall structure of the present embodiment is shown in FIGS. 15 through 30, in which a lock-up clutch 120 constructed in accordance with this embodiment includes a clutch plate 136, a side plate 130, a damper plate 132, a one-way clutch mechanism (outer ring 50, inner ring 52 and rollers 40), a reaction ring 134, a damper spring 44 and a retainer plate 138.

Figure 17:
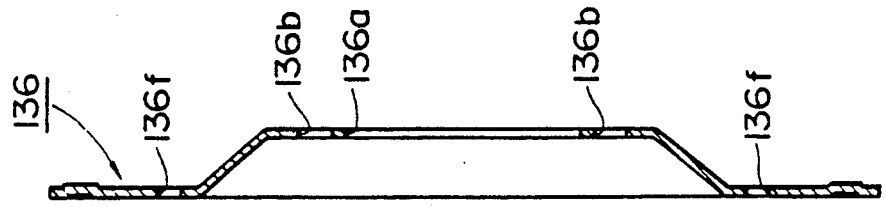
FIG. 17 is a schematic illustration showing the clutch plate in cross section taken along 17—17 line indicated in FIG. 16.
Figure 16:
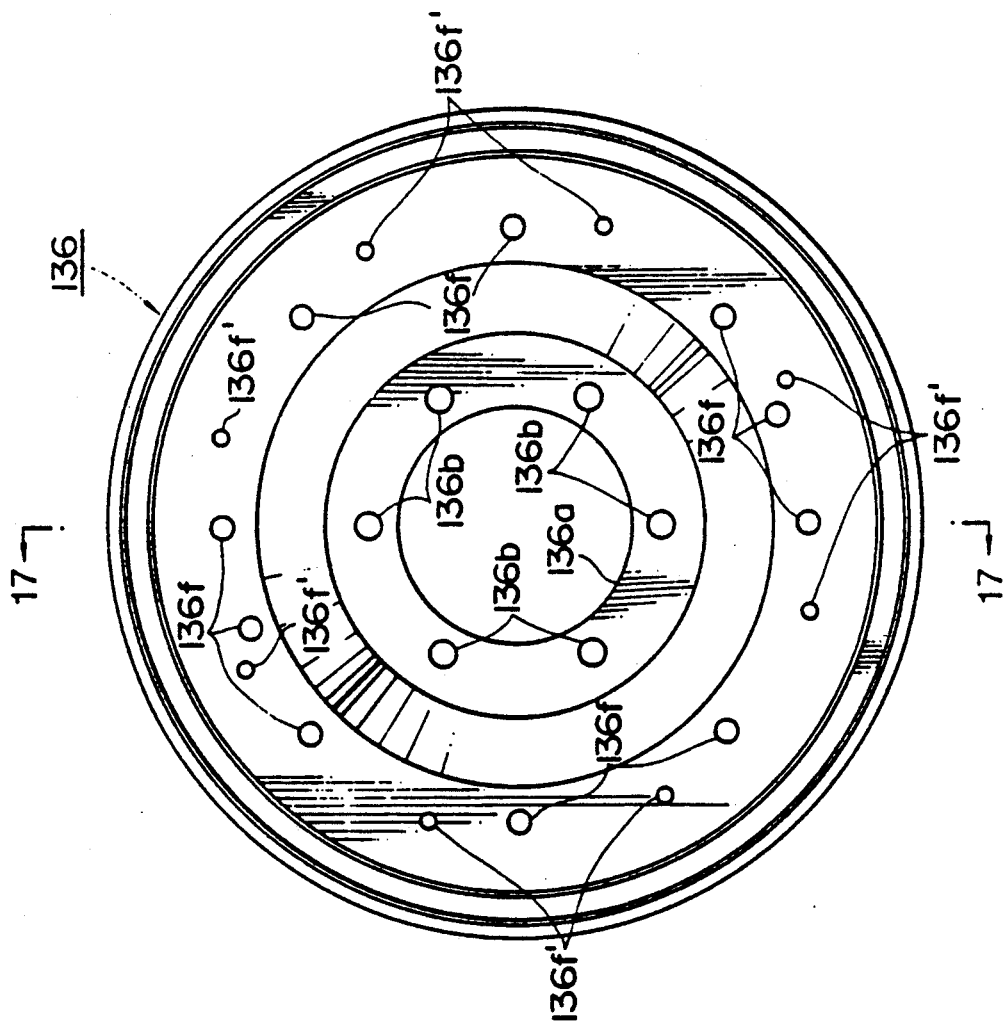
FIG. 16 is a schematic illustration showing in plan view a clutch plate of the lock-up clutch shown in FIG. 15.

The detailed structure of the clutch plate 136 is shown in FIGS. 16 and 17, and it is provided with a center hole 136a, into which a cylindrical portion of the turbine hub 17 (see FIG. 1) is fitted, and a plurality of mounting holes 136b located around the center hole 136a. Thus, by means of a rivet or pin 18 (see FIG. 1), the clutch plate 136 is integrally attached to the turbine hub 17. The clutch plate 136 is also provided with a plurality of inner ring mounting holes 136f which are used for fixedly attaching an inner ring 52, defining a portion of a one-way clutch mechanism, as will be described later.

FIGS. 18 and 19 illustrate the side plate 130 which is substantially ring-shaped and which is formed with an inner ring mounting hole 130a corresponding to the inner ring mounting hole 136f formed on the clutch plate 136. Thus, the inner ring 52 is sandwiched between the clutch plate 136 and the side plate 130 and the inner ring 52 is integrally supported between the clutch plate 136 and the side plate 130 using these inner ring mounting holes 136f and 130a.

The inner ring 52 is shown in FIGS. 28 and 29. The inner ring 52 constitutes one structural element of the one-way clutch mechanism of the present clutch apparatus and it has an inner peripheral surface 52a and is provided with a plurality of roller holding sections 52c spaced apart from each other along its outer periphery. Each of the roller holding sections 52c has the same shape and its bottom has an inclined bottom with respect to a predetermined circular circumference and thus this bottom forms a cam surface having a desired shape. As shown in FIG. 30, each of the roller holding sections 52c receives therein an associated roller 40 which can roll along the bottom of the roller holding section 52c over a predetermined distance in the circumferential direction within the limits of the roller holding section 52c. Each of the roller holding sections 52c has a first depth larger than the diameter of the roller 40 at one end thereof and a second depth smaller than the diameter of the roller 40 at the opposite end thereof. Thus, when the roller 40 is located at one end of the roller holding section 52c, the roller 40 does not project beyond the roller holding section 52c radially outwardly; on the other hand, when located at the opposite end, the roller 40 partially projects beyond the roller holding section 52c radially outwardly. In this manner, the bottom of the roller holding section 52c is so formed to have a straight or curved inclined surface with respect to a tangential line drawn at the same point of a circular circumference.

The inner ring 52 is also formed with a plurality of inner ring mounting holes 52b spaced apart from one another in the circumferential direction, and these mounting holes 52b are aligned in position with the inner ring mounting holes 136f and 130a of the clutch plate 136 and the side plate 130, respectively. Thus, the inner ring 52 may be fixedly attached between the clutch plate 136 and the side plate 130 by having mounting pins or the like fitted into these corresponding mounting holes 136f, 130a and 52b. Furthermore, the outer peripheral surface of the inner ring 52 is so structured to slidably guide the inner peripheral surface 50a of the outer ring 50.

That is, the outer ring 50 is shown in FIGS. 26 and 27 and it defines a one-way clutch mechanism together with the inner ring 52 and the rollers 40. The outer ring 50 has an inner peripheral surface 50a which defines a guide surface to be brought into slidable contact with the outer peripheral surface of the inner ring 52. Thus, when the outer ring 50 rotates in a predetermined direction relative to the inner ring 52, the rollers 40 are set in their deeper ends of respective roller holding sections 52c so that the outer ring 50 may rotate relative to the inner ring 52. On the other hand, when the outer ring 50 rotates in the opposite direction relative to the inner ring 52, the rollers 40 in the roller holding sections 52c are set in their shallower ends, so that the rollers 40 are clamped between the outer and inner rings 50 and 52 to have the outer and inner rings 50 and 52 clamped together. As a result, the outer ring 50 cannot rotate relative to the inner ring 52. In addition, an outer spline 50b is formed on the outer peripheral surface of the outer ring 50. This outer spline 50b is so formed to be in mesh with an inner spline 132e formed on the inner peripheral surface of the damper plate 132.

The detailed structure of the damper plate 132 is shown in FIGS. 20 and 21. As described previously, the inner spline 132e is formed on the inner peripheral surface of the damper plate 132 and the inner spline 132e may be brought into mesh with the outer spline 50b of the outer ring 50. Thus, in an assembled condition, the outer ring 50 defines a part of the damper plate 132 and thus it rotates together with the damper plate 132. The damper plate 132 includes a ring-shaped section 132a formed with the inner spline 132e and a plurality (3 in the illustrated embodiment) of projections 132b which project radially outwardly from the ring-shaped section 132a. Each of the projections 132b is formed approximately at its center with a window 132c for receiving therein a part of the damper spring 44, and a mounting hole 132d for fixedly attaching one end of a rivet or pin 35 for fixedly mounting a retainer plate 138 to the damper plate 132 as will be described later is provided at each side end of the projection 132b.

The lock-up clutch 120 of the present embodiment also includes a reaction ring 134 whose detailed structure is shown in FIGS. 22 and 23. The reaction ring 134 of the present embodiment is substantially identical to the reaction ring 34 of the previously described embodiment. That is, the reaction ring 134 includes a ring-shaped section 134a and a plurality (3 in the illustrated embodiment) of projections 134b extending radially outwardly from the ring-shaped section 134a. Each of the projections 134b is formed approximately at its center with a holding opening 134c for holding therein a damper spring 44 with a pair of arcuate-shaped slots 134d formed on opposite sides thereof. Furthermore, a pair of shoe assembly mounting holes 134e is formed at each side of the projection 134b. Thus, a shoe assembly 42 may be disposed in the space defined between the two adjacent projections 134b. When assembled, the inner peripheral surface 134f of the ring-shaped section 134a slidably guides the outer peripheral surface of the outer ring 50. Thus, in an assembled state, the reaction ring 134 is rotatable over a predetermined angular range relative to the damper plate 132. This is because, the damper plate 132 is integrally formed with the outer ring 50, but the reaction ring 134 is set to be rotatable relative to the outer ring 50.

Figure 24:
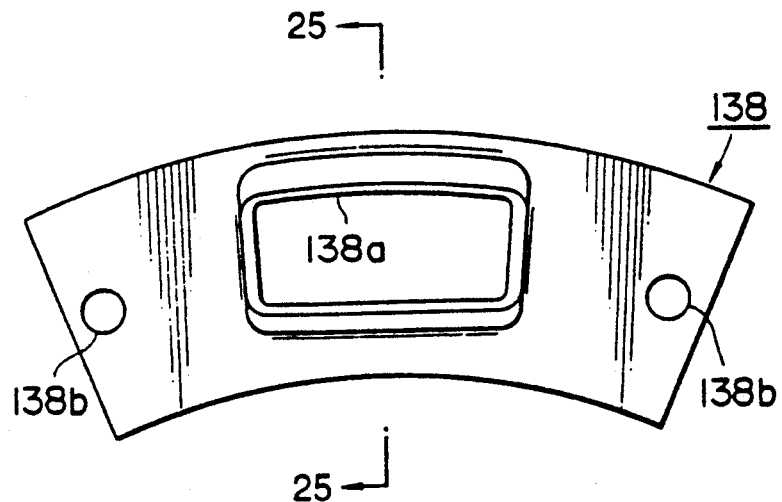
FIG. 24 is a schematic illustration showing the plan view a retainer plate of the lock-up clutch shown in FIG. 15.
Figure 25:
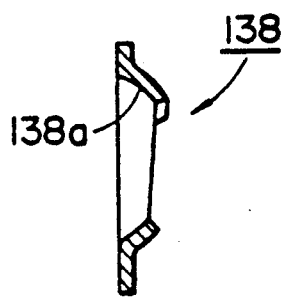
FIG. 25 is a schematic illustration showing the retainer plate in cross section taken along 25—25 line indicated in FIG. 24.

Also in the present embodiment use is made of a retainer plate 138 whose detailed structure is shown in FIGS. 24 and 25. The retainer plate 138 is substantially identical in shape with the retainer plate 38 of the previously described embodiment. Thus, the retainer plate 138 is fixedly attached to a corresponding projection 132b of the damper plate 132 by means of a rivet or pin 35 to thereby hold a damper spring 44 received in the mounting opening 134c of the reaction ring 134 in position.

As described above, also in the present embodiment, similarly with the previously described embodiment, the shoe assemblies 42 and the damper springs 44 are arranged along the same circular circumference, and the one-way clutch mechanism comprised of the outer ring 50, inner ring 50 and rollers 40 is arranged on a circular circumference which is concentric with and located at the same axial location with the circular circumference along which the shoe assemblies 42 and the damper springs 44 are arranged. Thus the one-way clutch mechanism, shoe assemblies 42 and damper springs 44 are all arranged substantially on the same plane which extends perpendicular to the rotating axis of the clutch apparatus. Thus, the relative rotation between the damper plate 132 (and thus the reaction ring 134 and the shoe assemblies 42) and the clutch plate 136 is permitted to take place only in a predetermined one direction and no rotation is transmitted between the two in the opposite direction. Also in the present embodiment, because of the provision of the damper springs 44, when the rotating force is transmitted from the shoe assemblies 42 to the damper plate 132 through the reaction ring 134 and the damper springs 44, such rotating force is transmitted to the clutch plate 136 through the outer ring 50, rollers 40 and inner ring 52. In this case, however, because of the provision of the damper springs 44, the transmission of rotating force can be carried out extremely smoothly during an initiation phase. Even if the rotating speed increases dramatically, the transmission of such rotating force is buffered and made extremely smooth because of the provision of the damper springs 44. On the other hand, in the case where the rotating speed decreases dramatically for some reason, the shoe assemblies 42 are still in frictional contact with the cover 12 so that when the shoe assemblies 42 are rapidly decelerated, the outer ring 50 tends to rotate in the opposite direction relative to the inner ring 52, and, as a result, the outer ring 50 is decoupled from the inner ring 52 with the rollers 40 set free, whereby the outer ring 50 rotates freely relative to the inner ring 52. Accordingly, in this case also, rapid changes in rotating speed at the driving side are prevented from being directly transmitted to the driven side.

In this manner, also in this embodiment, in order to make transmission of rotation from the input side to the output side smoother, although provision is made of the damper springs 44 and the one-way clutch mechanism comprised of the outer ring 50, inner ring 52 and rollers 40, the overall structure of the apparatus is made extremely compact in size and simple.

Figure 31:
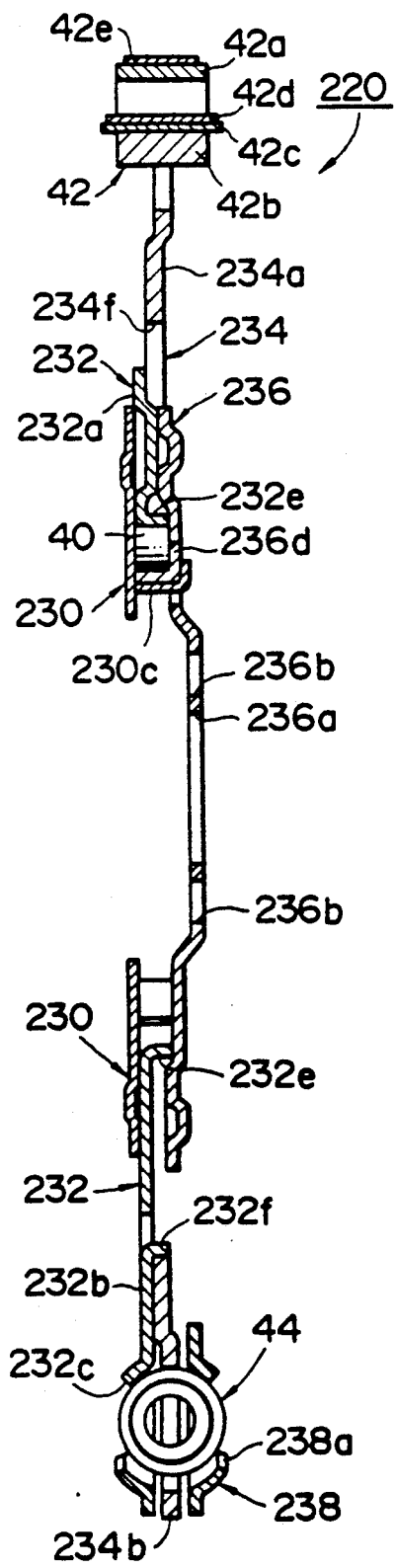
FIGS. 31 and 32 are schematic illustrations showing two alternative modifications of the embodiment shown in FIG. 3.
Figure 32:
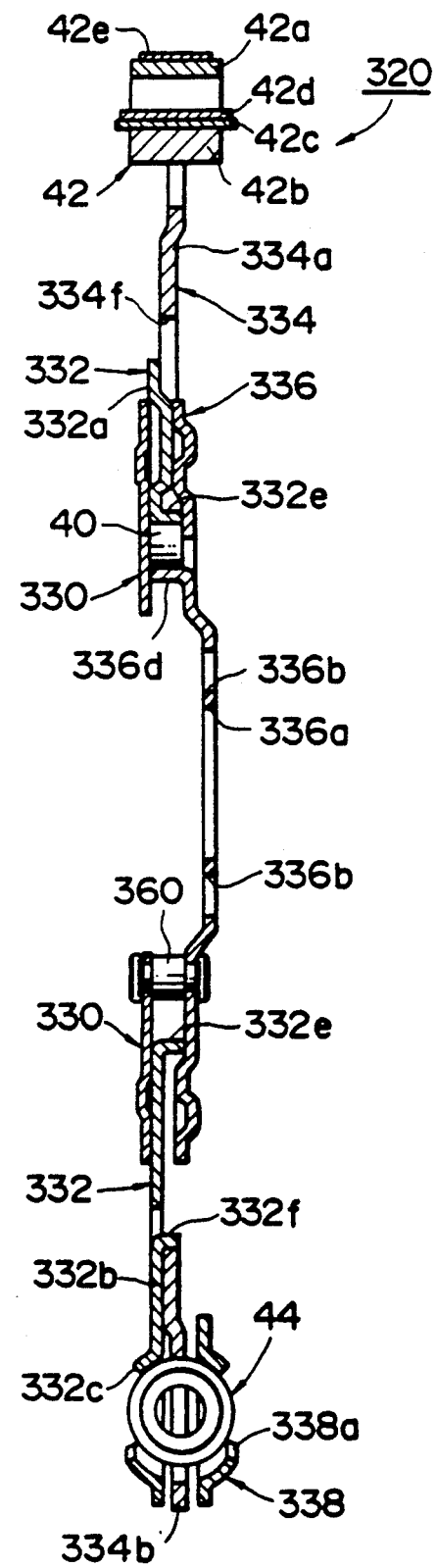

Further embodiments of the present invention are illustrated in FIGS. 31 and 32. These further embodiments are fundamentally modifications of the embodiment shown in FIG. 3, and, thus, they have a basic structure identical to that of the embodiment shown in FIG. 3. Thus, in the embodiments shown in FIGS. 31 and 32, similar elements are indicated by reference numerals which are defined by adding "200" or "300" to similar reference numerals shown in FIG. 3, respectively.

A lock-up clutch 220 shown in FIG. 31 is fundamentally similar in structure to the lock-up clutch 20 shown in FIG. 3. In the embodiment shown in FIG. 3, the first projection 36c is formed on the clutch plate 36 so as to have the side plate 30 integrally supported by the clutch plate 36. On the other hand, in the embodiment shown in FIG. 31, in place of the first projection 36c, a fourth projection 230c is formed on the side plate 230 and the tip end of the fourth projection 230c is bent to have the side plate 230 integrated with the clutch plate 236. The remaining structure is substantially the same as that of FIG. 3. Furthermore, in the lock-up clutch 320 shown in FIG. 32, in place of the first projection 36c in the embodiment shown in FIG. 3, use is made of a rivet or pin 360 to have the side plate 330 integrated with the clutch plate 336. The remaining structure of the lock-up clutch 320 shown in FIG. 32 is substantially identical to that of the embodiment shown in FIG. 3.

As described above, in accordance with the present invention, there is provided a speed responsive centrifugal one-way clutch which is simple in structure and extremely compact in the overall size. The lock-up clutch of the present invention is particularly small in size in the axial direction so that it is extremely useful when mounted in an apparatus, such as a torque converter. Furthermore, the damper springs and the shoe assemblies are arranged on the same circular circumference and the one-way clutch mechanism is disposed substantially concentrically and at the same axial location with the circular circumference on which the shoe assemblies and the damper springs are arranged. As a result, the forces acting on the present lock-up clutch would not have axial components so that the operating performance is significantly enhanced. Moreover, since it is structurally simple, manufacture is simple and a significant cost reduction can be expected. Besides, since the overall size of the apparatus is compact and the number of parts is minimized, the apparatus as a whole is light in weight, though it has a multiple of functions. Furthermore, since the present lock-up clutch incorporates the damper springs and the one-way clutch mechanism, transmission of rotating force from the input side to the output side is insured to be always extremely smooth and rapid changes in the rotating force at the input side are prevented from being transmitted to the output as they are. For example, when the present lock-up clutch were used in a torque converter of an automobile, since the torque converter itself could be made compact in size and thus mounting would be facilitated. In particular, during reduction in speed of an automobile, since the one-way clutch is set in its idling state, the lock-up clutch is set in its released condition to thereby improve the pleasantness in riding. Moreover, because of the provision of the damper springs, no shocks are transmitted when the lock-up clutch is set in its clutched condition.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A speed responsive one-way centrifugal clutch, comprising:
   a clutch plate which is approximately disc-shaped and which is fixedly attached to a rotating shaft;
   a damper plate which is supported to be rotatable relative to said clutch plate;
   a reaction ring which is supported to be rotatable over a predetermined angle range relative to said damper plate;
   a plurality of shoe assemblies which are supported by said reaction ring to be displasable radially outwardly due to centrifugal forces applied thereto; and
   a one-way clutch disposed between said clutch plate and said damper plate for transmitting a rotating force between said clutch plate and said damper only in a predetermined direction.

2. The clutch of claim 1, further comprising a plurality of damper means which are arranged between said damper plate and said reaction ring and substantially on the same circular circumference as that of said shoe assemblies.

3. The clutch of claim 1, wherein said clutch plate is provided with a plurality of first guide projections for guiding an inner peripheral surface of said damper plate during rotational motion thereof and said clutch plate is also provided with a plurality of roller holding sections which are arranged circumferentially, each of said roller holding sections holding therein a roller which may be brought into rolling contact with the inner peripheral surface of said damper plate.

4. The clutch of claim 3, wherein each of said roller holding sections has a bottom surface which is at least partly inclined with respect to a tangential line drawn at the same location thereof to thereby define a predetermined cam surface.

5. The clutch of claim 1, further comprising a side plate which is fixedly attached to said clutch plate as being disposed side-by-side with said clutch plate with a predetermined distance separated therefrom in the axial direction, whereby said damper plate is arranged to be rotatable between said clutch plate and said side plate.

6. The clutch of claim 1, wherein said damper plate is provided with a plurality of second guide projections which are arranged circumferentially, said plurality of second guide projections being in sliding contact with an inner circumferential portion of said reaction ring to thereby guide the rotating motion of said reaction ring over a predetermined angle range relative to said damper plate.

7. The clutch of claim 1, wherein said one-way clutch includes an inner ring, an outer ring fixedly attached to said damper plate and a plurality of rollers disposed between said inner and outer rings.

8. The clutch of claim 7, wherein at least one of said inner and outer rings is provided with a plurality of recesses, each of which has a predetermined cam surface, and a roller is received in each of said plurality of recesses.

9. The clutch of claim 7, wherein an outer spline is provided on an outer peripheral surface of said outer ring and an inner spline meshable with said outer spline is provided on an inner peripheral surface of said damper plate.

* * * * *